(12) United States Patent
Gupta et al.

(10) Patent No.: US 7,933,282 B1
(45) Date of Patent: Apr. 26, 2011

(54) PACKET CLASSIFICATION DEVICE FOR STORING GROUPS OF RULES

(75) Inventors: Pankaj Gupta, Palo Alto, CA (US); Liao Wei-Cherng, Los Angeles, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 214 days.

(21) Appl. No.: 11/935,270

(22) Filed: Nov. 5, 2007

Related U.S. Application Data

(60) Provisional application No. 60/888,928, filed on Feb. 8, 2007.

(51) Int. Cl.
*H04L 12/56* (2006.01)

(52) U.S. Cl. .......................................... 370/412; 726/3

(58) Field of Classification Search .................. None
See application file for complete search history.

(56) References Cited

U.S. PATENT DOCUMENTS

| | | | |
|---|---|---|---|
| 5,574,910 A | 11/1996 | Bialkowski et al. | |
| 6,018,524 A | 1/2000 | Turner et al. | |
| 6,154,384 A | 11/2000 | Nataraj et al. | |
| 6,192,051 B1 | 2/2001 | Lipman et al. | |
| 6,215,816 B1 | 4/2001 | Gillespie et al. | |
| 6,223,172 B1 | 4/2001 | Hunter et al. | |
| 6,307,855 B1 | 10/2001 | Hariguchi | |
| 6,374,326 B1 | 4/2002 | Kansal et al. | |
| 6,385,649 B1 | 5/2002 | Draves et al. | |
| 6,546,391 B1 | 4/2003 | Tsuruoka | |
| 6,571,313 B1 | 5/2003 | Filippi et al. | |
| 6,658,458 B1 * | 12/2003 | Gai et al. | 709/215 |
| 6,718,326 B2 * | 4/2004 | Uga et al. | 707/6 |
| 6,735,600 B1 | 5/2004 | Andreev et al. | |
| 6,741,591 B1 * | 5/2004 | Kaldani et al. | 370/389 |
| 6,778,530 B1 * | 8/2004 | Greene | 370/389 |
| 6,963,924 B1 | 11/2005 | Huang et al. | |
| 6,988,189 B1 * | 1/2006 | O'Connor et al. | 712/235 |
| 7,051,078 B1 * | 5/2006 | Cheriton | 709/214 |
| 7,162,481 B2 | 1/2007 | Richardson et al. | |
| 7,245,623 B1 * | 7/2007 | Cheriton | 370/393 |
| 7,249,228 B1 | 7/2007 | Agarwal et al. | |
| 7,266,085 B2 | 9/2007 | Stine | |
| 7,299,399 B2 | 11/2007 | Huang | |
| 7,313,666 B1 | 12/2007 | Saminda De Silva et al. | |
| 7,535,906 B2 * | 5/2009 | Engbersen et al. | 370/392 |
| 2002/0089937 A1 | 7/2002 | Venkatachary et al. | |
| 2007/0008962 A1 * | 1/2007 | Basu et al. | 370/389 |

OTHER PUBLICATIONS

A Fast and Scalable IP Lookup Scheme for High-Speed Networks, Chen et al., © 1999 IEEE, pp. 211-218.

(Continued)

*Primary Examiner* — Daniel J Ryman
*Assistant Examiner* — Brian Roberts
(74) *Attorney, Agent, or Firm* — Mahamedi Paradice Kreisman LLP; William L. Paradice, III

(57) ABSTRACT

A packet classification device includes a CAM device, an SRAM device, and a control circuit that controls and coordinates the operations of the CAM and SRAM devices. For some embodiments, a first CAM block stores unique entries for each packet header field, a RAM block coupled to the first CAM block stores field labels for the unique packet header fields, a second CAM block stores group labels consisting of unique combinations of concatenated field labels, and a second RAM block coupled to the second CAM block stores a group identification (ID) for each group label, wherein each group ID identifies a corresponding one of the groups of rules.

13 Claims, 25 Drawing Sheets

OTHER PUBLICATIONS

Efficient hardware Architecture for Fast IP Address Lokup, Pao et al., IEEE INFOCOM 2002, pp. 555-561.

Fast Address lookups using controlled Prefix Expansion, Venkatachary Srinivasan et al., ACM Transactions on Computer Systems, vol. 17., No. 1, Feb. 1999, pp. 1-40.

Fast and Scalable Layer 4 Switching, V. Srinivasan, G Varghese, S. Suri and M. Waldvogel, Presented at ACM Sigcomm '98, 18 page slide presentation.

Forwarding Engine for Fast Routing Lookups and Updates, Yu et al., 1999 Gobal Telecommunications Conference, pp. 1556-1564.

Gupta, "Algorithms for routing Lookups and packet Classification," Dec. 2000, pp. 1-197.

Lampson et al., "IP Lookup using Multiway and Multicolumn Search," Aug. 1997, pp. 1-23.

Packet Classification using hierarchical Intelligent Cuttings, Pankaj Gupta and Nick McKeown, Proc. Hot Interconnects VII, Aug. 1999, Stanford University.

Packet Classification on Multiple Fields, Pankj Gupta and Nick McKeown, Proc. Sigcomm, Computer Communication Review, vol. 29, No. 4, pp. 147-60, Sep. 1999 Harvard University.

Reconfigurable memory Architecture for Scalable IP Forwarding Engines, Akhbarizadeh et al., © 2002 IEEE, pp. 432-437.

* cited by examiner

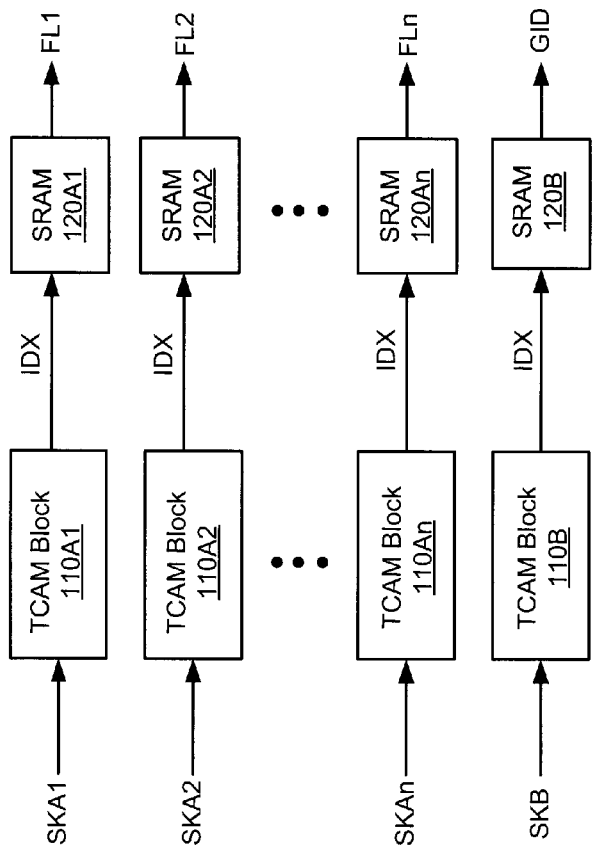
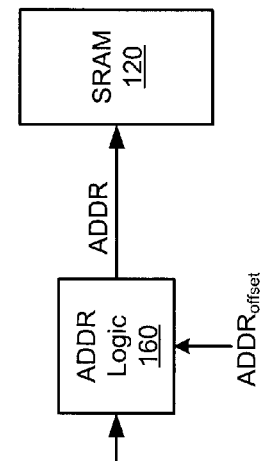
FIG. 1B
FIG. 1C

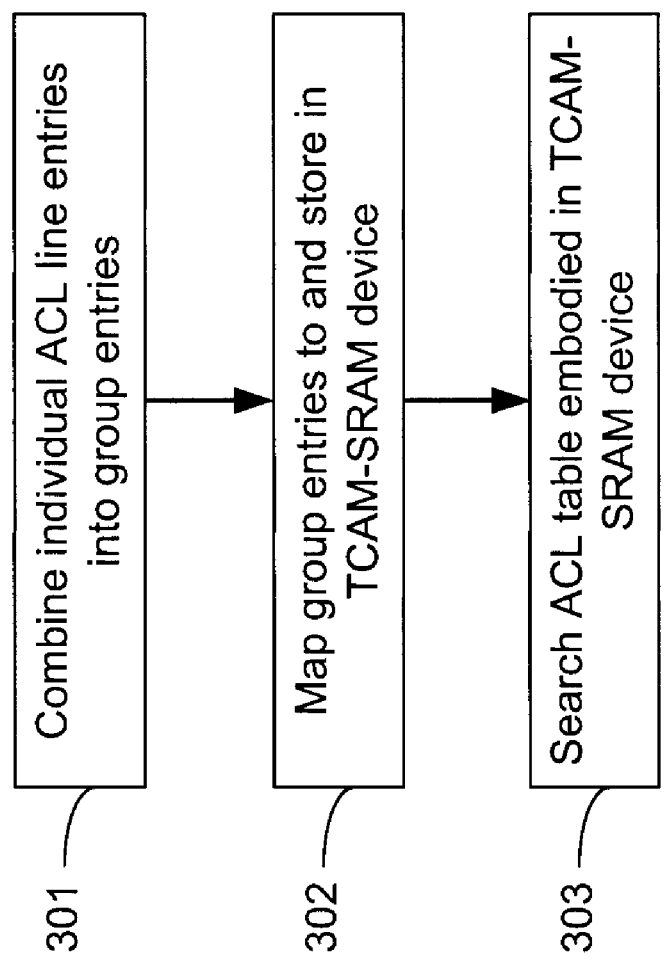

```
Let each rule/line in the original ACL file be an individual group itself.
Improvement = 1
While (Improvement > 0) {
    Improvement = 0
    Mark all groups unvisited and then go through all groups in order
    While (there is a group, G, unvisited) {
        Mark G visited
        IF (there is an existing target group, GT)
        {
            IF (the new group can be combined into the existing target group GT)
            {
                Combine these two groups into one group, GT
                Improvement++
            } ELSE {
                Let this group be the target group (GT ← G)
            }
        } ELSE {
            Let this group be the target group (GT ← G)
        }
    }
}
```

TCAM field entries:

| TCAM 110A1 | SRAM 120A1 |
|---|---|
| tcp | P1,0 |
| udp | P1,1 |
| icmp | P1,2 |

| TCAM 110A2 | SRAM 120A2 |
|---|---|
| 145.54.242.64 | S1,0 |
| 145.54.241.0 | S1,1 |

| TCAM 110A3 | SRAM 120A3 |
|---|---|
| 97.26.48.0 | D1,0 |
| 97.26.32.0 | D1,1 |

TCAM group entry:

| TCAM 110B | SRAM 120B |
|---|---|
| P1S1D1 | G1 |

FIG. 6C

TCAM field entries — TCAM 110:

| ADDR | SGMT1 | SGMT2 | SGMT3 |
|---|---|---|---|
| 1 | tcp | 145.54.242.64 | 97.26.48.0 |
| 2 | udp | 145.54.241.0 | 97.26.32.0 |
| 3 | icmp | | |

SRAM ADDR OFFSET VALUES:

| SGMT1 | SGMT2 | SGMT3 |
|---|---|---|
| 0 | 3 | 5 |

SRAM 120:

| ADDR | Contents |
|---|---|
| 1 | P1,0 |
| 2 | P1,1 |
| 3 | P1,2 |
| 4 | S1,0 |
| 5 | S1,1 |
| 6 | D1,0 |
| 7 | D1,1 |
| 8 | G1 |

| TCAM 110 | | | |
|---|---|---|---|
| ADDR | SGMT1 | SGMT2 | SGMT3 |
| 1 | tcp | 145.54.242.64 | 97.26.48.0 |
| 2 | udp | 145.54.241.0 | 97.26.32.0 |
| 3 | icmp | other entry | other entry |

TCAM field entries

FIG. 6D

| TCAM | | | SRAM |
|---|---|---|---|
| SGMT1 | SGMT2 | SGMT3 | |
| tcp | 145.54.242.64 | 97.26.48.0 | permit |
| udp | 145.54.242.64 | 97.26.48.0 | permit |
| icmp | 145.54.242.64 | 97.26.48.0 | permit |
| tcp | 145.54.242.64 | 97.26.32.0 | permit |
| udp | 145.54.242.64 | 97.26.32.0 | permit |
| icmp | 145.54.242.64 | 97.26.32.0 | permit |
| tcp | 145.54.241.0 | 97.26.48.0 | permit |
| udp | 145.54.241.0 | 97.26.48.0 | permit |
| icmp | 145.54.241.0 | 97.26.48.0 | permit |
| tcp | 145.54.241.0 | 97.26.32.0 | permit |
| udp | 145.54.241.0 | 97.26.32.0 | permit |
| Icmp | 145.54.241.0 | 97.26.32.0 | permit |

FIG. 6E

```
Step 1:
for each field i, {
  for each value of field Fi  {
    if (Fi belongs to exactly one rule/group) && (no overlap with all other field value Fj) {
      Eliminate this rule, store a pointer to this rule/group in SRAM for Fi, and store priority <0, i> in SRAM entry for Fi
    }
  }
}
Step 2:
phasenum=num_changed=0;
do {
  phasenum++;
  for each field i, {
    for each value of field Fi {
      if (Fi belongs to exactly one rule/group) && (no other field value is a subset of Fi) && (Fi is not already pinned) {
        Eliminate this rule/group, store a pointer in SRAM for Fi, and store priority <phasenum,i>
        Pin all Fj if the set represented by Fj fully or partially contains the set represented by Fi
        num_changed++;
      }
    }
  }
} until (num_changed == 0)
```

| Field Value | Label |
|---|---|
| icmp | P1 |
| udp | P2 |
| tcp | P3 |
| * | P4 |
| 168.120/16 | S1 |
| 168.129/16 | S2 |
| 168.120/16<br>168.125/16 | S3 |
| 168.120.9/24 | S4 |
| 168.1219/24<br>168.122.9/24 | S5 |
| 168.122.9/24<br>168.123.9/24 | S6 |
| 168.122.9/24 | S7 |
| * | D1 |
| 199.90/16<br>194.90/16 | D2 |
| 194.90/16 | D3 |
| 195.90/16 | D4 |
| * | E1 |
| > 1680<br>< 1000 | E2 |

FIG. 10A protocol

| TCAM 110A1 | SRAM 120A1 |
|---|---|
| icmp | P1 |
| udp | P2 |
| tcp | P3 |

Source address

| TCAM 110A2 | SRAM 120A2 |
|---|---|
| 168.120.9/24 | S4 |
| 168.122.9/24 | S5, S6, S7 |
| 168.123.9/24 | S6 |
| 168.121.9/24 | S5 |
| 168.125/16 | S3 |
| 168.120/16 | S1, S3 |
| 168.129/16 | S2 |

Destination address

| TCAM 110A3 | SRAM 120A3 |
|---|---|
| 199.90/16 | D1 |
| 194.90/16 | D2, D3 |
| 195.90/16 | D3 |
| * | D4 |

Destination port

| TCAM 110A4 | SRAM 120A4 |
|---|---|
| * | E1 |
| > 1680 | E2 |
| < 1000 | |

Group label

| TCAM 110B | SRAM 110B |
|---|---|
| P1S1D1E1 | G1 |
| P4S2D1E1 | G2 |
| P2S3D1E1 | G3 |
| P3S4D2E1 | G4 |
| P3S5D3E1 | G5 |
| P3S6D4E1 | G6 |
| P2S7D3E2 | G7 |

FIG. 10B

Protocol

| TCAM 110A1 | SRAM 120A1 |
|---|---|
| icmp | P1 |
| udp | P2 |
| tcp | P3 |
| * | P4 |

Source address

| TCAM 110A2 | SRAM 120A2 |
|---|---|
| 168.120.9/24 | G4; PTY=1 |
| 168.123.9/24 | G6; PTY=0 |
| 168.121.9/24 | G5; PTY=0 |
| 168.125/16 | G3; PTY=0 |
| 168.129/16 | G2; PTY=0 |

Destination address

| TCAM 110A3 | SRAM 120A3 |
|---|---|
| 195.90/16 | G6; PTY=2 |

Destination port

| TCAM 110A4 | SRAM 120A4 |
|---|---|
| > 1680 | G7; PTY=3; |
| < 1000 | G7; PTY=3 |

Group label

| TCAM 110B | SRAM 110B |
|---|---|
| P1S1D1 | G1 |
| P2S3D1 | G3 |
| P3S5D3 | G5 |

FIG. 10C

STEP I:
for each possible field combination Fi of field set {Fs} {
　for each rule R {
　　if (Fi in R belongs to exactly one rule/group) && (no other field value Fj is a subset of Fi) {
　　　Mark R can be eliminated by this Fi;
　　　Pin all rules which have the field combination that overlap with Fi
　　　num_changed_Fi++;
　　}
　}
} let Fc be the combination which maximize num_changed_Fi,
for each rule R {
　if (Fc in R belongs to exactly one rule [or exactly one group]) &&( no other field value Fj is a subset of Fi) {
　　Eliminate this rule/group and assign corresponding data into SRAM and TCAM;
　}
}

FIG. 11

```
Input: MAXBIT, Graph G (Tree)
Step 0: initialize the stat array
for each node N in G {
   for (i=0;i<MAXBIT;i++) {
      Stat[N].Len = -1;
      Stat[N].Label = -1;
      Stat[N].Bit = -1;
      Stat[N].NC[i] = 0;
      Stat[N].Code[i] = 0;
   }
}
Step1: compute the number of bits needed for this node and its descendants
for each layer in tree (from bottom layer (layer 0) to top layer) {
   for each leaf node Ni in this layer {
      if(this node has no child) {
         Stat[Ni].Bit = 0;
      } else {
         let weight = 1;
         let runningcode = 1;
         for(i=0;i<MAXBIT;i++) {
            weight += (Stat[Ni].NC[i] * 2^i);
               Stat[Ni].Code[i] = runningcode << i;
            runningcode = runningcode + Stat[Ni].NC[i] + 1;
            runningcode = runningcode >> 1;
         }
         Stat[Ni].Bit = ceil(log2(weight));
      }
   }
   let F be Ni's parent;
   Stat[F].NC[Stat[Ni].Bit]++;
}
Step2: assign label to each node
for each layer in tree (from top layer (root) to bottom layer) {
   for each leaf node Ni in this layer {
      if(Ni has no parent) {
         Stat[Ni].Len = 0;
         Stat[Ni].Label = 0;
      } else {
         let F be Ni's parent;
         Stat[Ni].Len = Stat[F].Len + Stat[F].Bit - Stat[Ni].Bit;
         Stat[Ni].Label = Stat[F].Label | Stat[F].Code[Stat[Ni].Bit];
         Stat[F].Code[Stat[Ni].Bit] += (1<<Stat[Ni].Bit);
      }
   }
}
```

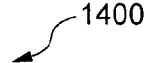

FIG. 14

PACKET CLASSIFICATION DEVICE FOR STORING GROUPS OF RULES

CROSS-REFERENCE TO RELATED APPLICATIONS

This application claims the benefit under 35 USC 119(e) of the co-pending and commonly owned U.S. Provisional Application No. 60/888,928 entitled "Classification Algorithm Based on Sets" filed on Feb. 8, 2007, which is incorporated by reference herein.

FIELD OF INVENTION

This invention generally relates to the packet classification operations and more specifically to the efficient storage of access control lists in a packet classification device.

BACKGROUND OF RELATED ART

Packet classification is employed by Internet routers to implement a number of advanced Internet services such as policy-based routing, rate-limiting, access control in firewalls, routing, service differentiation, traffic shaping, and traffic billing. Each of these services requires the router to classify incoming packets into different classes and then to perform appropriate actions depending upon the packet's specified class. For example, in packet routing applications, an incoming packet is classified to determine whether to forward or filter the packet, where to forward the packet to, what class of service the packet should receive, and/or how much should be charged for transmitting the packet. A packet classifier embodies a set of policies or rules that define what actions are to be taken based upon the contents of one or more fields of the packet's header. The packet header, which typically includes source and destination addresses, source and destination port numbers, protocol information, and so on, can match more than one rule. For example, one rule in a firewall application can specify either a "permit" or "deny" action for a given set of source and destination addresses, another rule in the firewall application can specify either a "permit" or "deny" action for a given protocol, and yet another rule in the firewall application can specify either a "permit" or "deny" action for a particular source address and protocol.

More specifically, in firewall applications, packet classification is performed using a collection of rules commonly known as an access control list (ACL), which is typically generated by a system administrator using well-known tools and then programmed in the routers using well-known firmware. For example, system administrators create control lists based on sets of machines and flows, and then use ACL tools to flatten the control lists into individual access control lines or rules, which are then stored in an ACL table.

Many network processors employ ternary content addressable memory (TCAM) devices to store the rules of various ACLs. During packet classification operations, selected information from an incoming packet's header can be simultaneously compared with all the rules stored in the TCAM device, thereby allowing packet classification to be performed at very high speeds. However, although capable of very fast searching speeds, TCAM devices are relatively large and expensive, as compared to RAM-based hash systems (e.g., because each TCAM cell includes two RAM cells and a compare circuit). As the amount of network traffic continually increases, the size and complexity of the ACL rules required to be stored in packet classification devices increases, which in turn makes TCAM-based packet classification solutions increasingly expensive to deploy in advanced Internet services such as firewall applications.

Thus, there is a need to reduce the amount of memory area in the TCAM portion of a packet classification device required to store ACLs for advanced Internet services such as firewall systems, intrusion detection systems, and other applications.

BRIEF DESCRIPTION OF THE DRAWINGS

The present invention is illustrated by way of example and not intended to be limited by the figures of the accompanying drawings, where:

FIG. 1B shows a simplified functional diagram of the ACL database for other embodiments of the present invention;

FIG. 1C shows a simplified functional diagram of the ACL database for other embodiments of the present invention;

FIG. 3 shows an illustrative flow chart depicting an exemplary ACL look-up operation in accordance with some embodiments of the present invention;

FIG. 4C shows an exemplary pseudo-code for the grouping operation depicted in FIGS. 4A-4B;

FIG. 6B illustrates the storage of the first ACL group in the database of FIG. 1B;

FIG. 6C illustrates the storage of the first ACL group in the database of FIG. 1C;

FIG. 6D illustrates the storage of the first ACL group and other ACL entries in the database of FIG. 1C;

FIG. 6E illustrates the storage of the first ACL in a TCAM-SRAM database in a conventional manner;

FIG. 9C shows an exemplary pseudo-code for the elimination operation depicted in FIGS. 9A-9B;

FIG. 10A illustrates the assignment of labels for a second ACL to be stored in the packet classification device of FIG. 1A;

FIG. 10B illustrates the storage of the second ACL after an exemplary grouping operation in the packet classification device of FIG. 1A;

FIG. 10C illustrates the storage of the second ACL after an exemplary grouping operation and an elimination operation in the packet classification device of FIG. 1A;

FIG. 11 shows an exemplary pseudo-code for a modified elimination operation that considers rule entries from multiple fields simultaneously;

FIG. 14 illustrates an exemplary pseudo-code of some label assignment techniques of the present invention.

Like reference numerals refer to corresponding parts throughout the drawing figures.

DETAILED DESCRIPTION

Figure 1A:
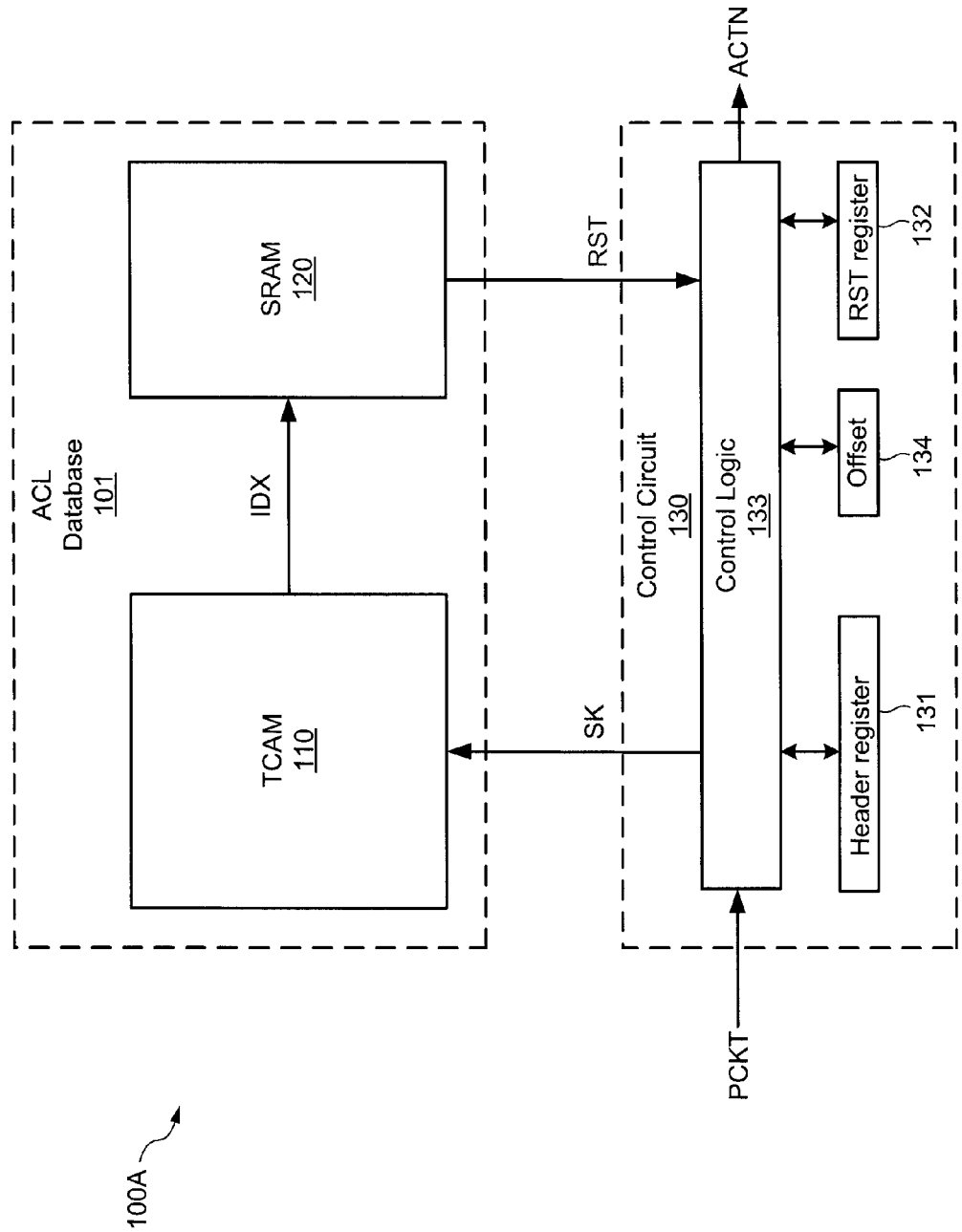
FIG. 1A shows a simplified functional diagram of a packet classification device in accordance with some embodiments of the present invention.

In the following description, numerous specific details are set forth such as examples of specific, components, circuits, and processes to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Embodiments of the present invention include various method steps, which will be described below. The steps may be performed by hardware components or may be embodied in machine-executable instructions, which may be used to cause hardware components (e.g., a processor, programming circuit) programmed with the instructions to perform the steps. Alternatively, the steps may be performed by a combination of hardware and software.

Embodiments of the present invention may be provided as a computer program product, or software, that may include a machine-readable medium having stored thereon instructions. The machine readable medium may be used to program a computer system (or other electronic devices) to generate articles (e.g., wafer masks) used to manufacture embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dies. The integrated circuit dies may then be assembled into packaged components. Design layout, mask layer generation, and the fabrication and packaging of integrated circuit dies are known in the art; accordingly, a detailed discussion is not provided.

It should be noted that the steps and operations discussed herein (e.g., the loading of registers) may be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be single signal lines, and each of the single signal lines may alternatively be buses. Additionally, the prefix symbol "/" or the suffix "B" attached to signal names indicates that the signal is an active low signal. Each of the active low signals may be changed to active high signals as generally known in the art.

For purposes of discussion herein, an access control list (ACL) contains a set of rules, and each rule is identified by a rule number and includes an action field, a protocol field, a source address field, a destination address field, a destination port field and/or a source port field. The action field stores an action to be taken for packets matching the rule. For example, the action can "permit" the packet to be forwarded or to "deny" the packet from being forwarded. The protocol field contains a protocol value that is compared with the protocol of incoming packets. For example, the protocol can identify the transmission control protocol (TCP), the user datagram protocol (UDP), the internet control message protocol (ICMP), and so on.

The source address field contains a source address (SA) that is compared with the source address of incoming packets, and the destination address field contains a destination address (DA) that is compared with the destination address of incoming packets. Together, the SA and DA represent the Layer-3 (L3) or network layer addresses. For example, the source and destination addresses are typically represented as series of four decimal numbers separated by periods and a prefix length IN that indicates the number of bits of the address included in the network portion of the address (e.g., 168.120.0.0/24). For example, in IPv6 routing operations, the 32-bit address "168.120.0.0/24" has a prefix length of 24, thereby indicating that the first 24 bits of the binary address (which correspond to the decimal representation 168.120.0) are typically unmasked during next-hop forwarding operations.

The source and destination port fields contain source and destination port entries that are compared with the source address port values of incoming packets, which together represent the Layer-4 (L4) or transport layer addresses. For example, the source and destination port addresses are typically represented as a single decimal number (e.g., port 1000). Of course, each rule can contain additional fields such as, for example, a class code and/or other information that can be matched with information containing in an incoming packets header.

As mentioned above, larger and more complex access control lists resulting from increasing Internet traffic requires TCAM devices employed as packet classifiers to store larger numbers of rules, which in turn requires more TCAM storage area. Because TCAM storage area is relatively expensive (e.g., as compared to other memory devices such as SRAM and DRAM), there is a need to increase the efficiency with which access control lists can be stored in TCAM-based packet classification devices. Thus, in accordance with the present invention, a method and apparatus are disclosed that allows the rules of one or more ACLs to be combined, formatted, and stored in a TCAM-based packet classification device in a manner that requires significantly less TCAM storage area than previous techniques.

For some embodiments, packet classification devices in accordance with the present invention include a TCAM device, an SRAM device, and a control circuit that controls and coordinates the operations of the TCAM and SRAM devices. For example, FIG. 1A shows a simplified functional block diagram of a packet classification device 100 in accordance with some embodiments of the present invention. Packet classification device 100 includes an ACL database 101 including a TCAM device 110 and a static random access memory (SRAM) device 120, and also includes a control circuit 130. TCAM device 110, which can be any well-known TCAM device, includes an input to receive a search key (SK) from control circuit 130, includes an output to provide an index (IDX) to SRAM 120, and includes an array having a plurality of storage locations (e.g., rows of CAM cells) to store ACL information formatted in accordance with embodiments of the present invention. For purposes of discussion herein, the TCAM array includes a plurality of rows of CAM cells that can be dynamically configurable into N 32-bit, N/2 72-bit, or N/4 144-bit storage locations, where N is an integer greater than 1.

SRAM 120 includes a plurality of storage locations (e.g., rows of memory cells) for storing ACL label information generating in accordance with embodiments of the present invention. SRAM 120 includes an address input to receive IDX from TCAM device 110, and includes an output to provide a corresponding result (RST) to control logic 130. SRAM 120 can be any well-known SRAM device. For other embodiments, SRAM 120 can be a DRAM or SDRAM device. For still other embodiments, SRAM 120 can be another type of addressable memory device such as Flash memory, EPROM, and so on.

Control circuit 130 includes a packet header register 131, a result register 132, and control logic 133. Control logic 133 includes an input to receive an incoming packet header (e.g., from a network processing unit or other suitable circuit or device), includes ports connected to TCAM device 110, SRAM device 120, packet header register 131, and result register 132, and includes an output to provide an action (ACTN). For some embodiments, control logic 133 provides a search key (SK) to TCAM 110, and receives a result (RST) from SRAM 120 output in response to a matching entry in TCAM 110. More specifically, control logic 133 is configured to store one or more various field values (such as protocol, source address, destination address, source port, destination port, and so on) extracted from the incoming packet's header into packet header register 131, to store results output from RAM 120 in response to compare operations in TCAM 110 into result register 132, and can be configured to form each search key SK using one or more packet header entries and/or one or more results from previous compare operations. Thus, in accordance with embodiments of the present invention, control logic 133 can be configured to selectively combine information from one or more fields of the packet header and/or with one or more results (e.g., from previous TCAM compare operations) to form each SK provided to TCAM 110. For some embodiments, the results RST of one or more compare operations in ACL database 101 can be concatenated to form another search key to be used in subsequent compare operations in ACL database 101, as described in more detail below.

Figure 2:
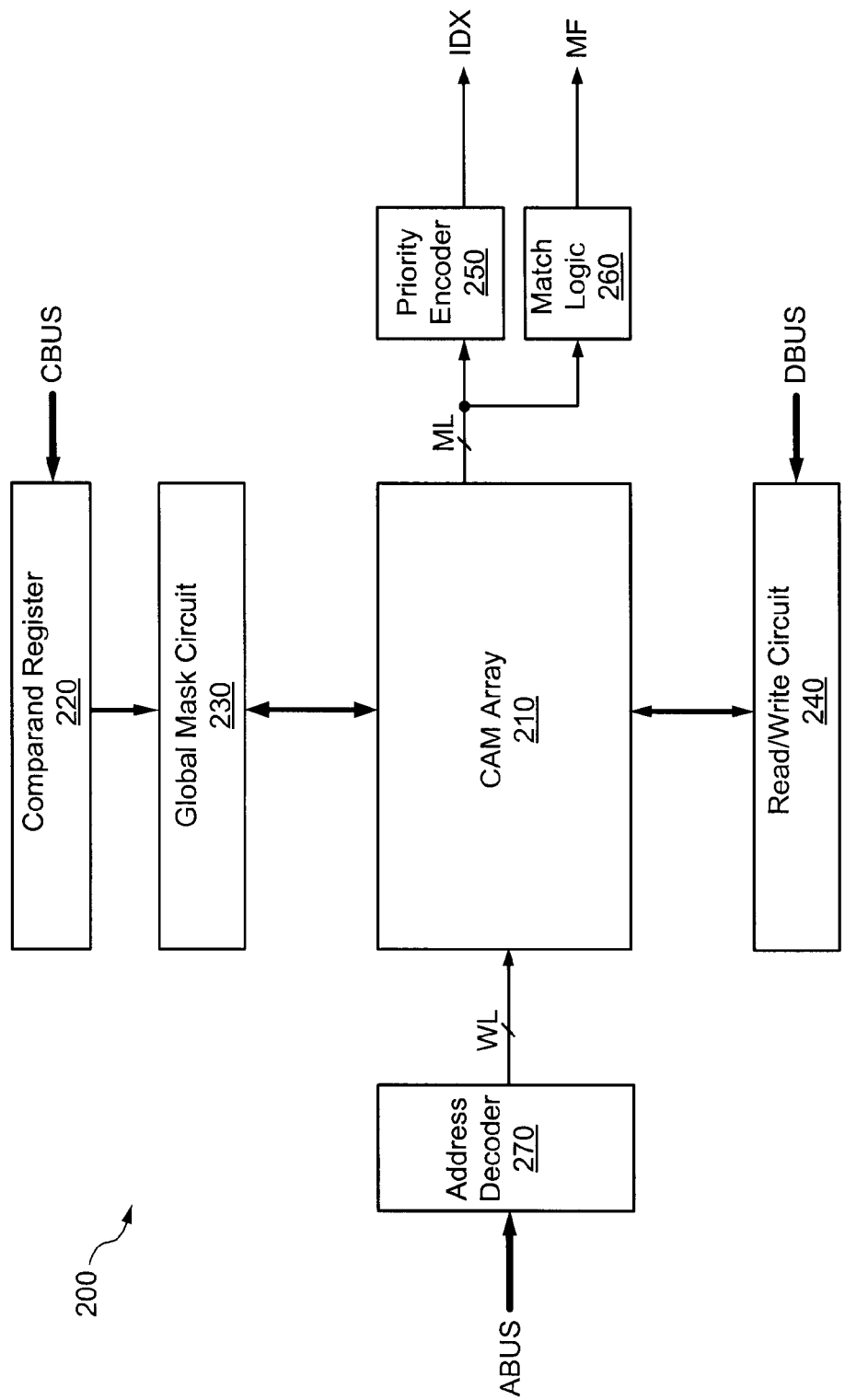
FIG. 2 shows a simplified functional diagram of the TCAM device of FIG. 1A in accordance with some embodiments of the present invention.

CAM device 110 can be any suitable CAM device such as a binary CAM device, a ternary CAM device, or a quaternary CAM device. For example, FIG. 2 shows a CAM device 200 that is one embodiment of CAM device 110 of FIG. 1A. CAM device 200 includes a CAM array 210, a comparand register 220, a global mask circuit 230, a read/write circuit 240, a priority encoder circuit 250, match logic 260, and an address decoder 270. CAM array 210 includes any number of rows of CAM cells (not shown in FIG. 2), which for some embodiments are TCAM cells (although for other embodiments CAM array 210 can include other types of CAM cells such as quaternary CAM cells). For exemplary embodiments described herein, CAM array 210 includes a plurality of 144-bit storage location or rows, although for other embodiments array 210 can include storage locations of other widths. Further, while CAM array 210 is shown in FIG. 2 as a single CAM array, it can be comprised of any number of CAM array blocks that can be independently searched, for example, as discussed above with respect to FIG. 1A.

One or more instructions and related control signals may be provided to CAM device 200 from an instruction decoder (not shown for simplicity) to control read, write, compare, and other operations for CAM device 200. Other well-known signals which can be provided to CAM device 200, such as enable signals, clock signals, and power connections, are not shown for simplicity. Further, although not shown in FIG. 2, each row of CAM cells in CAM array 210 have one or more validity bits to indicate whether the corresponding row (or any segment thereof) of CAM cells stores valid data. In addition, for some embodiments, the rows in CAM array 210 can be divided into a plurality of row segments, for example, to reduce the capacitive loading for each row or to provide multiple width/depth configurations for the array.

Each row of CAM cells in array 210 is coupled to well-known address decoder 270 via a corresponding word line WL, and to a well-known priority encoder 250 and to well-known match logic 260 via a corresponding match line ML. For simplicity, the word lines and match lines are represented collectively in FIG. 2. The match lines ML provide match results for compare operations between comparand data (e.g., a search key) and data stored in CAM array 210 to priority encoder 250. In response thereto, priority encoder 250 determines the matching entry that has the highest priority number associated with it and generates the index or address of this highest priority match (HPM). In addition, priority encoder 250 may use the validity bits from CAM array 210 to generate the next free address (NFA) that is available in CAM array 210 for storing new data. Although not shown in FIG. 2, for some embodiments, priority encoder 250 may provide the NFA to address decoder 270.

In accordance with the present invention, the amount of storage area required in a TCAM device such as TCAM 110 to store one or more ACLs can be reduced (as compared to prior techniques) by storing portions of the rule information in the SRAM device rather than in the TCAM device. More specifically, for some embodiments, the unique field entries for groups of ACL entries are stored in the TCAM device, while label information indicating which groups and/or rules the corresponding field entries are stored in the SRAM device. Thus, because the group field entries can require significantly less storage area than the original rules require, storing only the group field entries in the TCAM device significantly reduces the amount of TCAM storage area required, thereby allowing a TCAM device configured and populated in accordance with embodiments of the present invention to store a much larger number of ACLs and/or rules than in prior techniques.

For example, for the exemplary ACL1 shown below in Table 1, which contains 12 rules, a conventional TCAM-based packet classification device stores the 8-bit protocol value, the 32-bit SA value, and the 32-bit DA value (as well as a 16-bit source port field, a 16-bit destination port field, and other flags/control information) of each rule in a corresponding 144-bit storage location (e.g., row) of the TCAM device, and stores the action codes for the rules in corresponding storage locations (e.g., rows) of the SRAM device, thereby requiring 12 rows of the TCAM-SRAM device to store ACL1, as shown in FIG. 6E, where the protocol entries are stored in row segments SGMT1 of the TCAM, the SA entries are stored in row segments SGMT2 of the TCAM, the DA entries are stored in row segments SGMT3 of the TCAM, and the action field entries are stored in corresponding rows of the SRAM device.

During look-up operations, the packet header information (e.g., protocol value, SA value, and DA values for this example) of an incoming packet is compared with the 12 TCAM entries of FIG. 6E corresponding to the 12 rules, and if a matching entry is found, the action stored in the row of the SRAM corresponding to the matching TCAM entry is output and used as an action code (e.g., to determine whether to forward the packet to its destination or to deny access for the packet).

For simplicity, only the protocol, SA, and DA field values for ACL1 are shown below in Table 1. Thus, for actual embodiments, each rule or entry of ACL1 may also include other fields such as source port and destination port.

TABLE 1

Exemplary Access Control List 1

| Rule | ACL ID | Action | Protocol | Source Address | Destination Address |
|------|--------|--------|----------|----------------|---------------------|
| 1 | 1 | permit | tcp | 145.54.242.64 | 97.26.48.0 |
| 2 | 1 | permit | udp | 145.54.242.64 | 97.26.48.0 |
| 3 | 1 | permit | icmp | 145.54.242.64 | 97.26.48.0 |
| 4 | 1 | permit | tcp | 145.54.242.64 | 97.26.32.0 |
| 5 | 1 | permit | udp | 145.54.242.64 | 97.26.32.0 |
| 6 | 1 | permit | icmp | 145.54.242.64 | 97.26.32.0 |
| 7 | 1 | permit | tcp | 145.54.241.0 | 97.26.48.0 |
| 8 | 1 | permit | udp | 145.54.241.0 | 97.26.48.0 |
| 9 | 1 | permit | icmp | 145.54.241.0 | 97.26.48.0 |
| 10 | 1 | permit | tcp | 145.54.241.0 | 97.26.32.0 |
| 11 | 1 | permit | udp | 145.54.241.0 | 97.26.32.0 |
| 12 | 1 | permit | Icmp | 145.54.241.0 | 97.26.32.0 |

In contrast, embodiments of the present invention can be used to store ACL1 in only 8 32-bit storage locations of the TCAM device, or alternately in only 3 72-bit rows of the TCAM device, as described in more detail below. The general operation of combining ACL rule entries into groups, storing the resulting groups in an ACL database, and then searching the ACL database is depicted in the illustrative flow chart of FIG. 3. For some embodiments, a compiler or a suitable software tool implemented by a computer or processor can be used to combine the individual ACL rules or entries into groups, and thereafter can be used to map the resulting groups entries to the TCAM-SRAM database for storage therein. Then, during search operations, an incoming packet header is provided as a search key to the TCAM-SRAM database to determine whether the incoming packet matches one or more ACL rules or entries represented in the TCAM-SRAM database.

Referring to FIG. 3, the individual ACL line entries are first combined into a number of groups based upon similarities of field entries of the various rules (step 301). Then, the field entries of the resulting groups are mapped to and stored in the TCAM device, and a plurality of corresponding labels that indicate which groups the various field entries belong to are stored in the associated SRAM device (step 302). Subsequently, during look-up operations, an incoming packet's header field values can be compared with the group entries stored in the TCAM device to determine what action is to be taken for the incoming packet, and the rules that match the incoming packet can be identified and output (step 303).

Figure 4A:
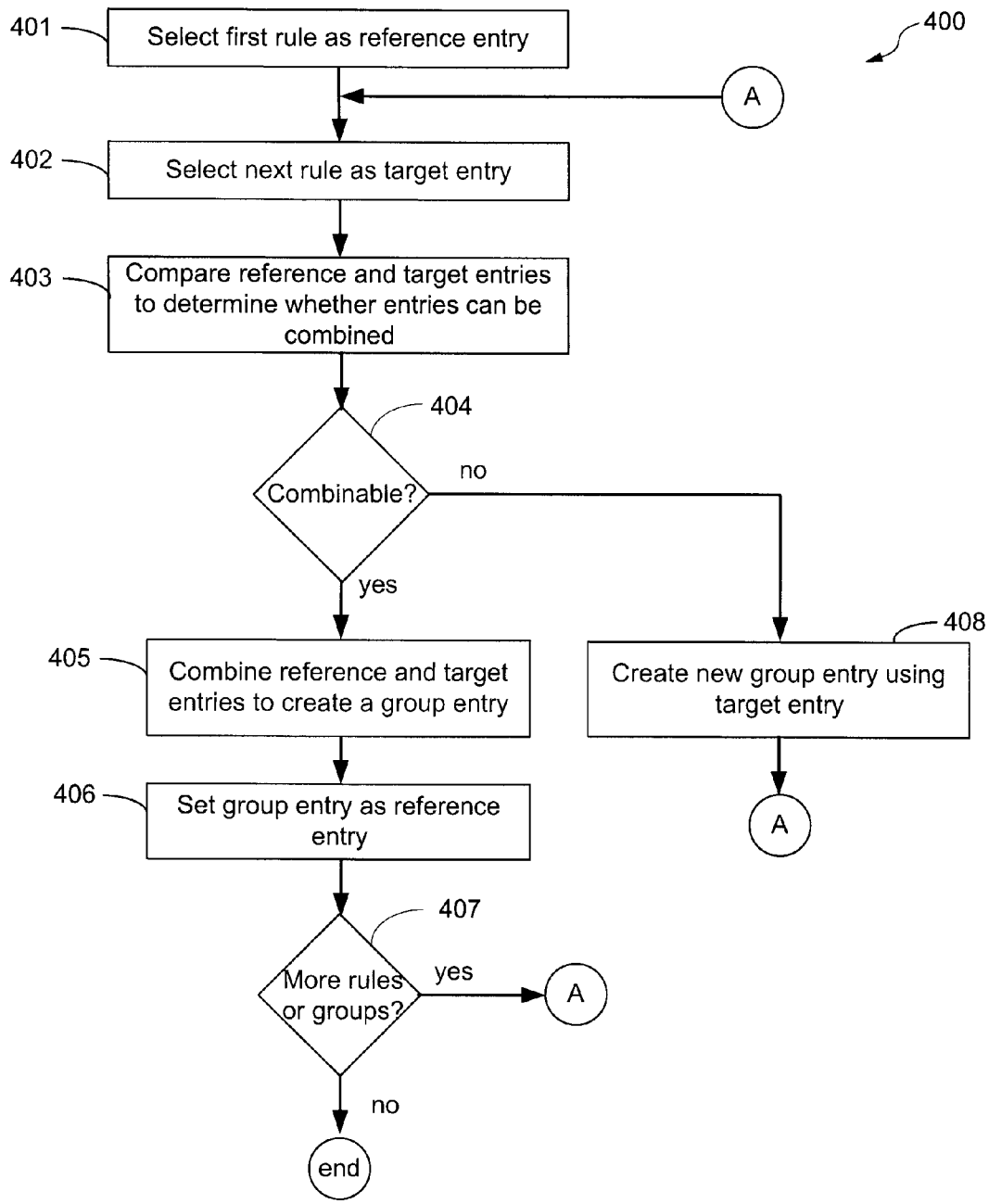
FIGS. 4A-4B show an illustrative flow chart depicting an exemplary operation for combining ACL entries into groups.

An exemplary operation for combining the 12 rules of ACL1 shown in Table 1 into a single group to reduce the required amount of TCAM storage area is described below with respect to the illustrative flow chart 400 of FIG. 4A. First, one of the individual rules is selected as a reference entry (step 401). Then, a next rule is selected as a target entry for comparison with the reference entry (step 402). Then, the reference entry and the target entry are compared with each other to determine whether the two rules can be combined in accordance with the present invention to form a single group entry (step 403).

For some embodiments, the reference rule and the target rule can be combined into a single group entry if both rules have the same action field and both rules differ in only one of the corresponding packet header fields (e.g., the protocol, SA, and DA fields). For example, an exemplary operation for determining whether two rules can be combined is described below with respect to the illustrative flow chart of FIG. 4B. First, the action fields of the reference rule and the target rules are compared (step 403a). If the action fields of the two rules are the same, as tested at step 403b, then the subset of fields selected for grouping the packet header fields of the reference rule and the target rule are compared with each other (step 403c). If only one of the packet header field entries of the reference rule and the target rule are different, as tested at step 403d, then the reference rule and the target rule can be combined. If more than one of the packet header field entries are different (as tested at step 403d), or if the action fields are different (as tested at step 403b), then the two rules cannot be combined (at least not in this first iteration), and processing continues at step 408 of FIG. 4A.

Referring again to FIG. 4A, if the rules can be combined, as tested at step 404, the reference and target rules are combined to create a group entry that represents both the reference rule and the target rule (step 405). More specifically, the group entry is formed by copying the contents of the matching fields of the reference and target entries and by concatenating the contents of the differing fields of the reference and target entries. For example, rules 1 and 2 are combinable because both rules have the same action (i.e., permit), and only the contents of the protocol field differ (i.e., rule 1 is "tcp," rule 2 is "udp," and both rules 1 and 2 have the same SA and DA). Then, to combine rules 1 and 2, a new group entry is formed that has the action, SA, and DA field set to the common entries, and the protocol field contains the differing protocols "tcp" and "udp." The new group entry resulting from the combination of rules 1 and 2 is shown below in Table 2.

TABLE 2

| ACL ID | Action | Protocol | source address | destination address |
|--------|--------|----------|----------------|---------------------|
| 1 | permit | {tcp, udp} | 145.54.242.64 | 97.26.48.0 |

Then, after formation of the new group entry, the new group entry is set as the reference entry (step 406), and if there are any additional uncombined rules or groups remaining, as tested at step 407, processing continues at step 403. For example, the new group entry of Table 2 is set as the reference entry, the next rule in the ACL (e.g., rule 3) is set as the target entry, and the group entry and target entry are combined if they have the same action and differ in only one of the packet header fields. Because rule 2 has the same action (i.e., "permit"), the same SA, and the same DA, thereby differing only in the protocol field, rule 2 can be combined with the group of Table 2 to form a new group shown below in Table 3.

TABLE 3

| ACL ID | Action | Protocol | source address | destination address |
|---|---|---|---|---|
| 1 | permit | {tcp, udp, icmp} | 145.54.242.64 | 97.26.48.0 |

If a target entry cannot be combined with the reference entry, as tested at step 404, then a new group entry is created using the non-combinable target entry. For example, because rule 4 has a protocol field and a DA field that is different from the group entry of Table 3, a new group is created using rule 4, and processing continues at step 402. Thereafter, rule 5 is combined with rule 4 to create a new group (e.g., because rules 4 and 5 differ only in the protocol field), and then rule 6 is combined with the group 4-5 because rule 6 differs only in the protocol field. For the ACL entries of Table 1, combining the individual rule entries 1-12 using the operation depicted in FIGS. 4A-4B initially results in the formation of 4 group entries, as summarized below in Table 4A, where rules 1-3 are combined to form group 1A, rules 4-6 are combined to form group 2A, rules 7-9 are combined to form group 3A, and rules 10-12 are combined to form group 4A.

TABLE 4A

Iteration A Grouping Results

| Group | ACL ID | Action | Protocol | Source Address | Destination Address |
|---|---|---|---|---|---|
| 1A | 1 | permit | {tcp, udp, icmp} | 145.54.242.64 | 97.26.48.0 |
| 2A | 1 | permit | {tcp, udp, icmp} | 145.54.242.64 | 97.26.32.0 |
| 3A | 1 | permit | {tcp, udp, icmp} | 145.54.241.0 | 97.26.48.0 |
| 4A | 1 | permit | {tcp, udp, icmp} | 145.54.241.0 | 97.26.32.0 |

Thereafter, the grouping process is continued in one or more subsequent iterations until no more entry grouping is possible. For example, the groups 1A-4A formed in the first iteration are examined in a second iteration to determine whether any of the groups 1A-4A can be combined in the manner described above with respect to FIGS. 2A-2B. For example, because groups 1A and 2A differ only in the DA field, groups 1A and 2A can be combined to form a new group 1B, and because groups 3A and 4A differ only in the DA field, groups 3A and 4A can be combined to form a new group 2B, as illustrated below in Table 4B.

TABLE 4B

Iteration B Grouping Results

| Group | ACL ID | Action | Protocol | Source Address | Destination address |
|---|---|---|---|---|---|
| 1B | 1 | permit | {tcp, udp, icmp} | 145.54.242.64 | 97.26.48.0 97.26.32.0 |
| 2B | 1 | permit | {tcp, udp, icmp} | 145.54.241.0 | 97.26.48.0 97.26.32.0 |

Then, the groups 1B-2B formed in the first iteration are examined in a second iteration to determine whether any of the groups 1B-2B can be combined in the manner described above with respect to FIGS. 2A-2B. For example, because groups 1B and 2B differ only in the SA field, groups 1B and 2B can be combined to form a new group 1C, as illustrated below in Table 4C.

TABLE 4C

Iteration C Grouping Results

| Group | ACL ID | action | Protocol | Source Address | Destination Address |
|---|---|---|---|---|---|
| 1C | 1 | permit | {tcp, udp, icmp} | 145.54.242.64 145.54.241.0 | 97.26.48.0 97.26.32.0 |

Figure 4B:
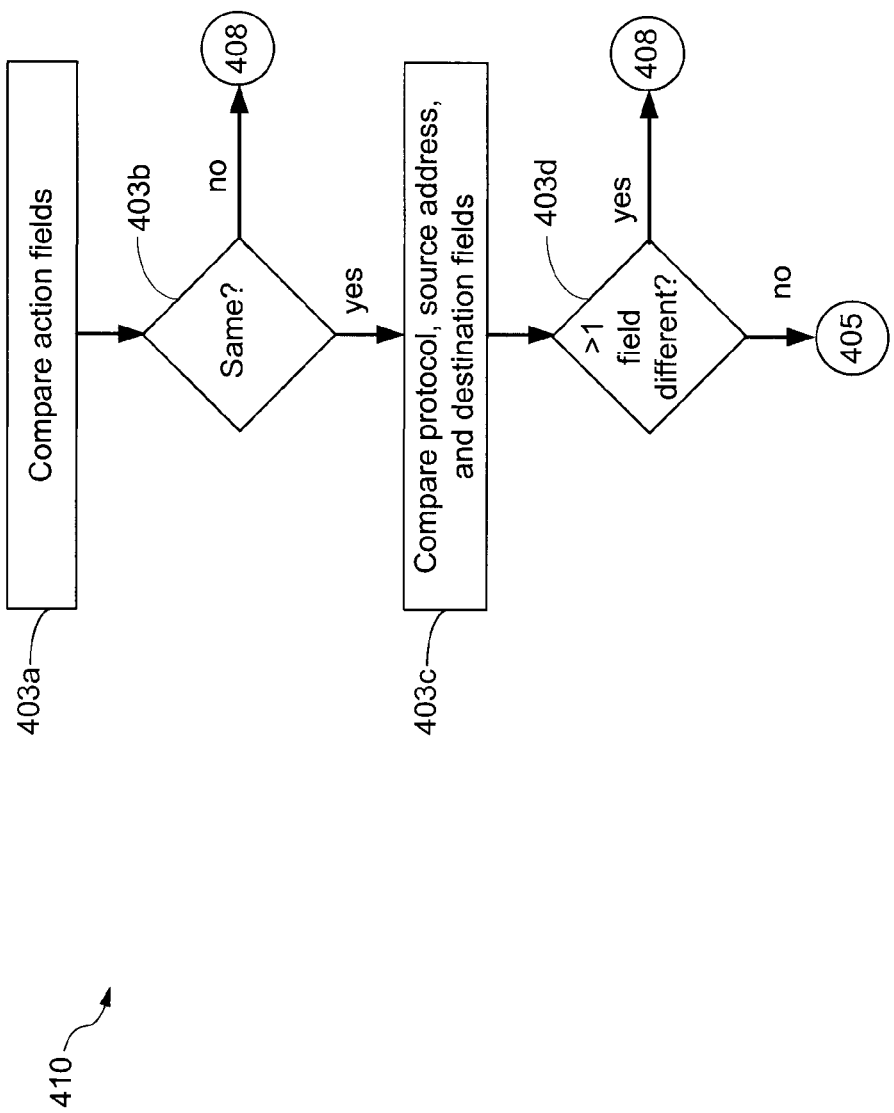

For the exemplary embodiment described above, the process of grouping the lines of ACL1 is performed on a line-by-line basis, and therefore requires multiple iterations to achieve a minimum number of final groups. An exemplary pseudo-code 420 embodying the combination operation depicted in FIGS. 4A-4B is shown in FIG. 4C. For other embodiments, other techniques (e.g., such as hashing techniques) can be used to expedite the grouping process of ACL entries.

Referring again to FIG. 3, after the ACL rule entries are combined to form group entries, the group entries are then mapped to and stored in the packet classification device 100 (step 302). For example, an exemplary operation for mapping and storing the ACL group of Table 4C into the packet classification device 100 of FIG. 1A is described below with respect to the illustrative flow chart of FIG. 5. First, each unique packet header field value of the group is stored in a corresponding row of the TCAM array (step 501). For some embodiments, the TCAM locations that store the packet header field entries are collectively referred to as a TCAM "field" block. Then, each TCAM field entry is assigned a label and an offset value, which are then stored in a corresponding row of the SRAM device (step 502). The label identifies which group or groups the field value belongs to, and the offset value identifies the relative order of the corresponding value within the same field. Next, a concatenated label corresponding to the ACL group is stored in the TCAM (step 503). The TCAM locations that store the ACL group labels are designated as a TCAM "group" block. Then, the TCAM group entry is assigned group ID, which is then stored in a corresponding row of the SRAM device (step 504).

Figures 5, 6A:
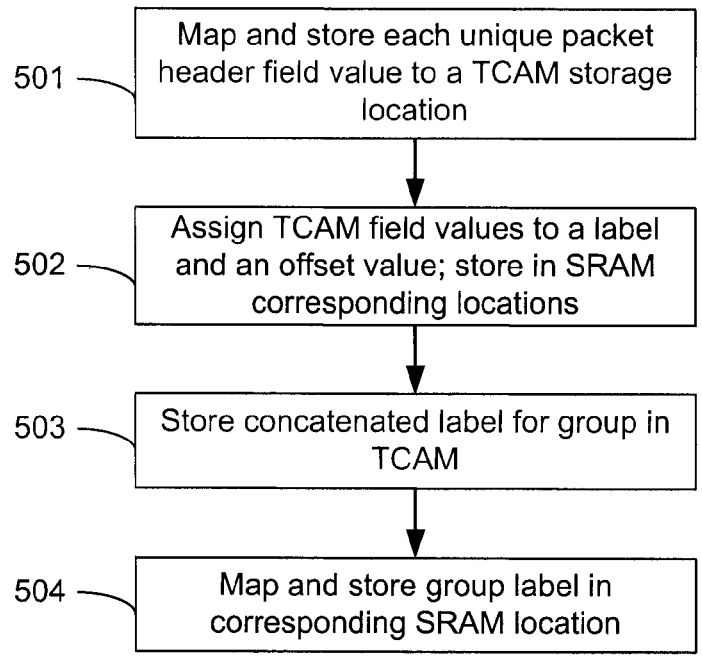
FIG. 5 shows an illustrative flow chart depicting an exemplary operation for storing the groups of ACL entries into the packet classification devices of FIG. 1A.
FIG. 6A illustrates the storage of a first ACL group in the database of FIG. 1A.

For the ACL group entry 1C of Table 4C, each of the 7 unique field entries is stored in a corresponding storage location (e.g., row) of the TCAM device 110, which as depicted in FIG. 6A are stored at TCAM addresses (ADDR) 1-7. Then, the 3 unique protocol entries (i.e., tcp, udp, and icmp) of the group are assigned to a protocol label P1, the 2 unique SA entries (i.e., 145.242.64 and 145.54.241.0) are assigned to an SA label S1, and the 2 unique DA entries (i.e., 97.26.48.0 and 97.26.32.0) are assigned to a DA label D1, and are stored in corresponding storage locations (e.g., rows) of the SRAM device 120. Then, the concatenated group label for the combined ACL group entry (P1S1D1) is stored at row ADDR=8 in the TCAM device 110, and its group ID (G1) is stored in the corresponding SRAM location, as depicted in FIG. 6A. Thus, TCAM entries 1-7 corresponding to the packet header fields are referred to as the TCAM-field block, and TCAM entry 8 corresponding to the group label is referred to as the TCAM-group block.

The ability to combine individual ACL entries to form group entries and then store the groups and associated labels in the packet classification device 100 can significantly reduce the number of TCAM storage locations (e.g., CAM rows) required to store the ACL. More specifically, the number of separate TCAM storage locations required for grouping embodiments of FIG. 5 (i.e., in which each distinct packet header field value is stored in a separate TCAM entry) can be expressed as G+FGS, where G is the number of groups and FGS is the sum of the number of unique field entries for each group. For example, while conventional techniques require 12 TCAM storage locations to store the 12 rules of ACL1, combining the 12 rules into one group having 7 distinct field entries requires only G+FGS=1+7=8 separate TCAM locations for present embodiments, thereby resulting in an 1−(8/12)=33% reduction in the number of TCAM storage locations required to store the ACL information. Further reductions in TCAM storage area are achieved when the resulting group entries are smaller than 144 bits.

Note that the offset entries stored in SRAM 120 can be used to recover the original ACL rule number that matches the incoming packet. More specifically, the rule number (RN) can be determined according to the expression:

$$RN = RN_i + \sum_{i=i}^{NumField} \left( \text{offset\_field}_i * \prod_{i=1}^{i-1} \text{\#\_distinct\_field}_j \right),$$

where $RN_i$ is the starting rule number. More specifically, the original rule number is determined by multiplying each offset value times the number of distinct entries for the other fields to produce a field rule factor, and then adding 1 to the sum of all field rule factors. Thus, for the above example, the protocol offset "0" is multiplied by the sum of distinct entries for the SA and DA fields (i.e., 0*(2+2)=0), the SA offset "1" is multiplied by the sum of distinct entries for the protocol and DA fields (i.e., 1*(3+2)=6), the DA offset "0" is multiplied by the sum of distinct entries for the protocol and SA fields (i.e., 0*(3+2)=0), and thus the sum 1+0+6+0=7 identifies the original rule R7 of Table 1.

Figure 7:
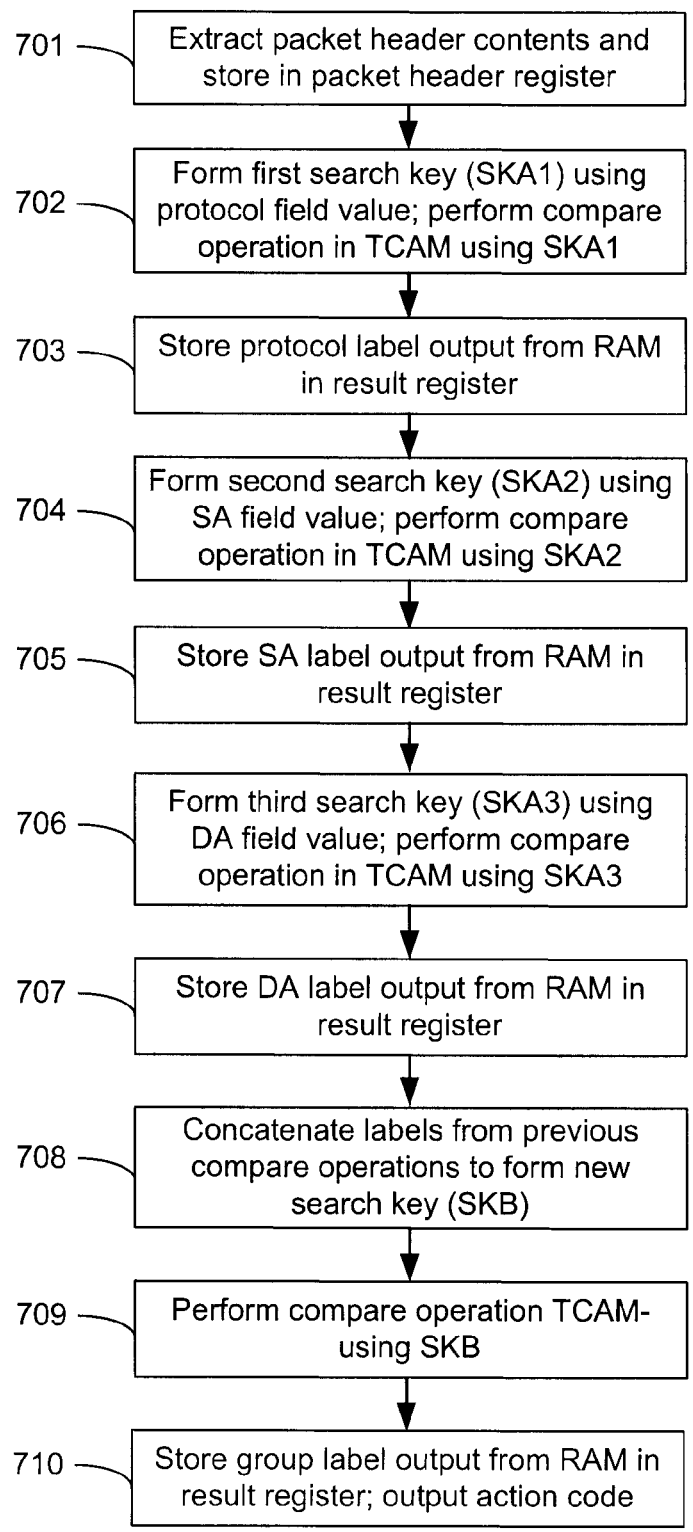
FIG. 7 shows an illustrative flow chart depicting an exemplary look-up operation for some embodiments of the packet classification devices of FIG. 1A.

Referring again to FIG. 3, search operations between an incoming packet and the ACL entries stored in the packet classification device 100 in accordance with present embodiments can be performed using sequential compare operations to determine which group the incoming packet belongs to, from which can be derived what action should be taken with respect to the incoming packet (step 303). For example, an exemplary search operation for an incoming packet having the value {protocol,SA,DA}={tcp, 145.54.241.0, 97.26.48.0} with the ACL entries of FIG. 6A is described below with respect to the illustrative flow chart of FIG. 7. First, the incoming packet header is received by control logic 133, and control logic 133 extracts the protocol field value, the SA field value, and the DA field value from the packet header and stores the header field values in the packet header register 131 (step 701). Control logic 133 then compares the received packet header field values with the field entries stored in TCAM 110 during first compare operations.

More specifically, control logic 133 forms a first search key (SKA1) using the extracted protocol field value, and provides SKA1 to TCAM 110 for a compare operation (step 702). The resulting protocol label output from SRAM 120 in response to the TCAM compare operation is then stored in result register 132 (step 703). For this example, control logic 133 forms SKA1=tcp, which matches the "tcp" entry at TCAM address ADDR=1 and causes SRAM 120 to output the corresponding label-offset pair value {P1,0} stored at SRAM ADDR=1. Control logic 133 then stores the result RST={P1,0} in result register 132.

Next, control logic 133 forms a second search key SKA2 using the extracted SA field value, and provides SKA2 to TCAM 110 for a compare operation (step 704). The resulting SA label output from SRAM 120 in response to the TCAM compare operation is then stored in result register 132 (step 705). For this example, control logic 133 forms SKA2=145.54.241.0, which matches the "145.54.241.0" entry at TCAM address ADDR=5, and causes SRAM 120 to output the corresponding label-offset pair value {S1,1} at SRAM ADDR=5. Control logic 133 then stores the result RST={S1,1} in result register 132.

Next, control logic 133 forms a third search key SKA3 using the extracted DA field value, and provides SKA3 to TCAM 110 for a compare operation (step 706). The resulting DA label output from SRAM 120 in response to the TCAM compare operation is then stored in result register 132 (step 707). For this example, control logic 133 forms SKA3=97.26.48.0, which matches the "97.26.48.0" entry at TCAM address ADDR=6, and causes SRAM 120 to output the corresponding label-offset pair value {D1,0} at SRAM ADDR=6. Control logic 133 then stores the result RST={D1, 0} in result register 132.

Then, control logic 133 concatenates the results of the 3 field value compare operations (which are stored in result register 332) to form a modified search key SKB to be compared with the group labels stored in TCAM 110 (step 708). Then, control logic 133 provides SKB to TCAM 110 for a compare operation to determine the group ID for the incoming packet (step 709). The resulting group ID output from SRAM 120 is stored in result register 132, and can thereafter be used to output the corresponding action code. For this example, control logic 133 forms SKB=P1S1D1, which matches the "P1S1D1" entry at TCAM ADDR=8, and causes SRAM 120 to output the corresponding group ID G1 at SRAM ADDR=8. The group label G1 is stored in result register 132, and the corresponding action code (i.e., "permit") is output as ACTN.

For some embodiments, a memory element (not shown for simplicity) within or associated with control logic 133 can be used to store the action codes for corresponding group labels. For other embodiments, the action codes can be stored together with the group labels in SRAM 120.

Note that because the packet header (e.g., protocol, SA, and DA field entries) compare operations described above with respect to FIG. 7 are not dependent upon each other, these compare operations can be performed simultaneously rather than sequentially. Thus, for other embodiments, the protocol, SA, and DA field entries can be stored in different TCAM-SRAM blocks that can be simultaneously searched using different search keys and control signals provided by control logic 133.

For example, FIG. 1B shows an ACL database 102 that is another embodiment of the ACL database 101 of FIG. 1A. ACL database 102 includes a plurality of independently searchable TCAM blocks 110A and 120B and a plurality of corresponding SRAM blocks 120A and 120B. More specifically, each of first TCAM blocks 110A1-110An stores unique entries for a corresponding field of the packet header, receives a corresponding one of search keys SKA1-SKAn from control logic 133 (see also FIG. 1A), and is coupled to a corresponding one of first SRAM blocks 120A1-120An. Each of first SRAM blocks 120A1-120An stores label and offset entries for a corresponding packet header field, and in response to an index provided by the associated TCAM block, outputs a corresponding field label (FL) to control logic 133. For example, TCAM block 110A1 can store the unique protocol entries, TCAM block 110A2 can store the unique SA entries, and TCAM block 110A3 can store the unique DA entries, while SRAM 120A1 can store the protocol labels, SRAM 120A2 can store the SA labels, and SRAM 120An can store the DA labels. Further, second TCAM block 110B can store the group labels, receives a search key SKB from control logic 133 (see also FIG. 1A), and is coupled to a corresponding second SRAM block 120B. Second SRAM block 120B stores the group IDs, and in response to an index provided by TCAM block 120B, outputs a group ID (GID) to control logic 133.

Although not shown in FIG. 1B, each TCAM block 110 can also receive one or more control signals from control logic 133 that can be used to control the timing and coordination of compare operations therein. In this manner, control logic 133 can be configured to provide different packet header field search keys SKA1-SKAn to the various TCAM-field blocks 110A1-110An for a plurality of simultaneous first compare operations therein, concatenate the resulting field labels output from first SRAM blocks 120A1-120An to form the search key SKB, and then provide SKB to TCAM block 110B for the second compare operation to identify a matching group ID in SRAM block 120B. In this manner, look-up operations can be performed in only 2 sequential TCAM compare operations.

For example, to implement simultaneous field compare operations for the ACL entries shown in FIG. 6A, the set of protocol entries can be stored in TCAM block 110A and the protocol labels can be stored in SRAM block 120A1, the set of SA entries can be stored in TCAM block 110A2 and the SA labels can be stored in SRAM block 120A2, the set of DA entries can be stored in TCAM block 110A3 and the DA labels can be stored in SRAM block 120A3, and the concatenated label P1S1D1 can be stored in TCAM block 120B and the group ID G1 can be stored in SRAM block 120B, as shown in FIG. 6B. Alternatively, the concatenated label P1S1D1 and the group label G1 can be stored in one of the field TCAM-SRAM blocks 110A-120A.

Thereafter, during a first look-up operation, control logic 133 can provide SKA1 to TCAM block 110A1, provide SKA2 to TCAM block 110A2, and provide SKA3 to TCAM block 110A for simultaneous compare operations therein and therefore concurrently provide the protocol, SA, and DA labels from SRAM blocks 120A1-120A3 to control logic 133. Then, control logic 133 can concatenate the field labels FL1-FL3 output from corresponding SRAM blocks 120A1-120A3 to form SKB, and provide SKB to TCAM block 110B for comparison with the group label entry "P1S1D1" to generate the group ID G1.

For other embodiments, concurrent compare operations for different packet header fields can be performed using CAM devices of the type described in commonly owned U.S. Pat. No. 6,744,652 issued Jun. 1, 2004, which is incorporated by reference herein.

Although the ACL database 102 of FIG. 1B requires only 2 sequential TCAM compare operations, the ACL database 101 can store ACL entries in a more efficient manner. More specifically, because ACL database 101 of FIG. 1A can store all field entries in the same TCAM array, rather than partitioning the array into individual blocks and then assigning each block to store entries for corresponding packet header field, ACL database 101 may achieve greater occupancy rates than ACL database 102 due to uncertainty in partitioning the TCAM block prior to ascertaining the number of ACL entries associated with each packet header field.

For the exemplary embodiments described above with respect to FIGS. 1A-1B, storing only one distinct field value in each row of the TCAM array can result in a less than optimal utilization of the TCAM storage area. For example, as depicted in FIG. 6A, storing only the 8-bit "tcp" field value in the first row of the TCAM 110 (which for exemplary embodiments described herein can include up to 144 CAM cells for storing 144 bits of data) results in the first TCAM row having a large number of unused storage bits. Thus, for other embodiments of the present invention, the ACL database can be configured to allow a plurality of distinct field entries of grouped ACL entries to be stored in each row of the database.

For example, FIG. 1C shows an ACL database 103 in accordance with other embodiments of the present invention. ACL database 103 includes TCAM device 110, SRAM 120, and address logic 160. For the embodiment of FIG. 1C, control circuit 130 includes an offset register 134 (see also FIG. 1A) coupled to control logic 133, which includes an output to provide an SRAM address offset value ($ADDR_{offset}$) to address logic 160. Address logic 160, which can be formed using well-known summing logic, sums the index (IDX) output from TCAM 110 with $ADDR_{offset}$ provided from control logic 133 to generate an address (ADDR) provided to SRAM 120.

When storing ACL entries in the ACL database 103, a plurality of distinct field entries are stored in a corresponding plurality of segments of each TCAM row, and an associated SRAM offset value ($ADDR_{offset}$) is stored in a corresponding location of offset register 134. For one example, the protocol field entries "tcp," "udp," and "icmp" can be stored in the first segment (SGMT1) of TCAM rows 1-3, respectively, the SA field entries "145.54.242.64" and "145.54.210.0" can be stored in the second segment (SGMT2) of TCAM rows 1-2, respectively, and the DA field entries "97.26.48.0" and "97.26.32.0" can be stored in the third segment (SGMT3) of TCAM rows 1-2, respectively, as depicted in FIG. 6C. Label data is stored in SRAM 120 in the manner described above with respect to the exemplary embodiments of FIG. 1A. Then, $ADDR_{offset}$ entries of "0," "3," and "5" are stored for SGMT1-SGMT3, respectively, in offset register 134 so that during compare operations in TCAM 110 the appropriate value of $ADDR_{offset}$ is added to IDX to address the correct location in SRAM 120, as depicted in FIG. 6C. For simplicity, the TCAM-group entry is not shown in FIG. 6C. In this manner, the field value information for ACL1 can be stored in only 3 rows of TCAM 110, which is only 3/12=25% of the number of TCAM rows required to conventionally store the 12 rules of ACL1.

More specifically, during a first compare operation in TCAM 110 to match protocol information, SGMT2 and SGMT3 of TCAM 110 are masked (e.g., using global mask circuit 230 of FIG. 2) and SKA1 is compared with the protocol field entries stored in SGMT1 of the TCAM rows. For the first compare operation, which corresponds to TCAM SGMT1, $ADDR_{offset}=0$ so that the value of IDX output from TCAM 110 is used as ADDR to address SRAM 120.

Then, during a second compare operation in TCAM 110 to match SA information, SGMT1 and SGMT3 of TCAM 110 are masked (e.g., using global mask circuit 230 of FIG. 2) and SKA2 is compared with the SA field entries stored in SGMT2 of the TCAM rows. For the second compare operation, which corresponds to TCAM SGMT2, $ADDR_{offset}=3$ so that the value of IDX output from TCAM 110 is incremented by 3 to generate ADDR. For example, if SKA2="145.54.242.64," which matches the SA value stored in SGMT2 of TCAM row 1, TCAM 110 outputs IDX=1, address logic 160 adds $ADDR_{offset}=3$ to IDX to generate ADDR=4, which correctly identifies the corresponding label "S1,0" stored at SRAM address 4.

Finally, during a third compare operation in TCAM 110 to match DA information, SGMT1 and SGMT2 of TCAM 110 are masked (e.g., using global mask circuit 230 of FIG. 2) and SKA3 is compared with the DA field entries stored in SGMT3 of the TCAM rows. For the third compare operation, which corresponds to TCAM SGMT3, $ADDR_{offset}=5$ so that the value of IDX output from TCAM 110 is incremented by 5 to generate ADDR. For example, if SKA3="97.26.32.0," which matches the DA value in SGMT3 of TCAM row 2, TCAM 110 outputs IDX=2, address logic 160 adds $ADDR_{offset}=5$ to IDX to generate ADDR=7, which correctly identifies the corresponding label "D1,1" stored at SRAM address 7.

Note that for the exemplary embodiments of FIG. 10, any unused bits in the TCAM rows assigned for storing one combined ACL entry may be used to store one or more field entries for another combined ACL entry, as depicted in FIG. 6D. For example, SGMT2 and SGMT3 of the TCAM row at ADDR=3 can be used to store the SA and DA for another ACL.

Further reductions in TCAM storage area can be achieved by eliminating selected ACL information from storage in the TCAM-group block (e.g., TCAM block 110B of FIG. 1A) and instead storing pointers corresponding to the selected groups and priority entries in the SRAM device. Storing ACL information in the SRAM device rather than in the TCAM device is desirable because, as mentioned above, an SRAM device of a given storage capacity is much less expensive (e.g., in terms of cost and circuit area) and consumes less power than a TCAM device of the same storage capacity.

In general, a selected group can be eliminated from storage in the TCAM-group block if the group contains a unique packet header field value such that a match between a search key (e.g., for an incoming packet) and the unique field entry stored in the TCAM-field look-up operation can identify only the selected group. For example, referring to the exemplary ACL2 shown below in Table 5, the SA field value "168.129/16" is unique to rule 2, and therefore if a search key SK for an incoming packet matches the TCAM-field entry "168.129/16" (e.g., SK=186.129.0.0), then rule 2 can be the only possible rule match for the search key SK (e.g., assuming the other packet header field values also match the corresponding field entries for rule 2). As a result, the group label information corresponding to rule 2 need not be stored in the TCAM-group block, but instead can be stored in the SRAM device as a group pointer and priority value, thereby advantageously reducing the amount of ACL data required to be stored in the TCAM device.

An exemplary operation for eliminating group label information for ACL2 of Table 5 from storage in the TCAM-group block is described below with respect to the illustrative flow chart of FIG. 8. Note that the packet header information for the ACL2 shown below in Table 5 includes a destination port (DP) field (e.g., in addition to the protocol field, the SA field, and the DA field entries described above with respect to ACL1).

TABLE 5

ACL2

| Rule | ACL ID | Action | Protocol | Source Address | Destination Address | Destination Port |
|---|---|---|---|---|---|---|
| 1 | 2 | permit | icmp | 168.120/16 | * | * |
| 2 | 2 | permit | * | 168.129/16 | * | * |
| 3 | 2 | permit | udp | 168.120/16 | * | * |
| 4 | 2 | permit | udp | 168.125/16 | * | * |
| 5 | 2 | permit | tcp | 168.120.9/24 | 199.90/16 | * |
| 6 | 2 | permit | tcp | 168.120.9/24 | 194.90/16 | * |
| 7 | 2 | permit | tcp | 168.121.9/24 | 194.90/16 | |
| 8 | 2 | permit | tcp | 168.122.9/24 | 194.90/16 | * |
| 9 | 2 | permit | tcp | 168.122.9/24 | 195.90/16 | * |
| 10 | 2 | permit | tcp | 168.123.9/24 | 195.90/16 | * |
| 11 | 2 | permit | udp | 168.122.9/24 | 194.90/16 | >1680 |
| 12 | 2 | permit | udp | 168.122.9/24 | 194.90/16 | <1000 |

Figure 8:
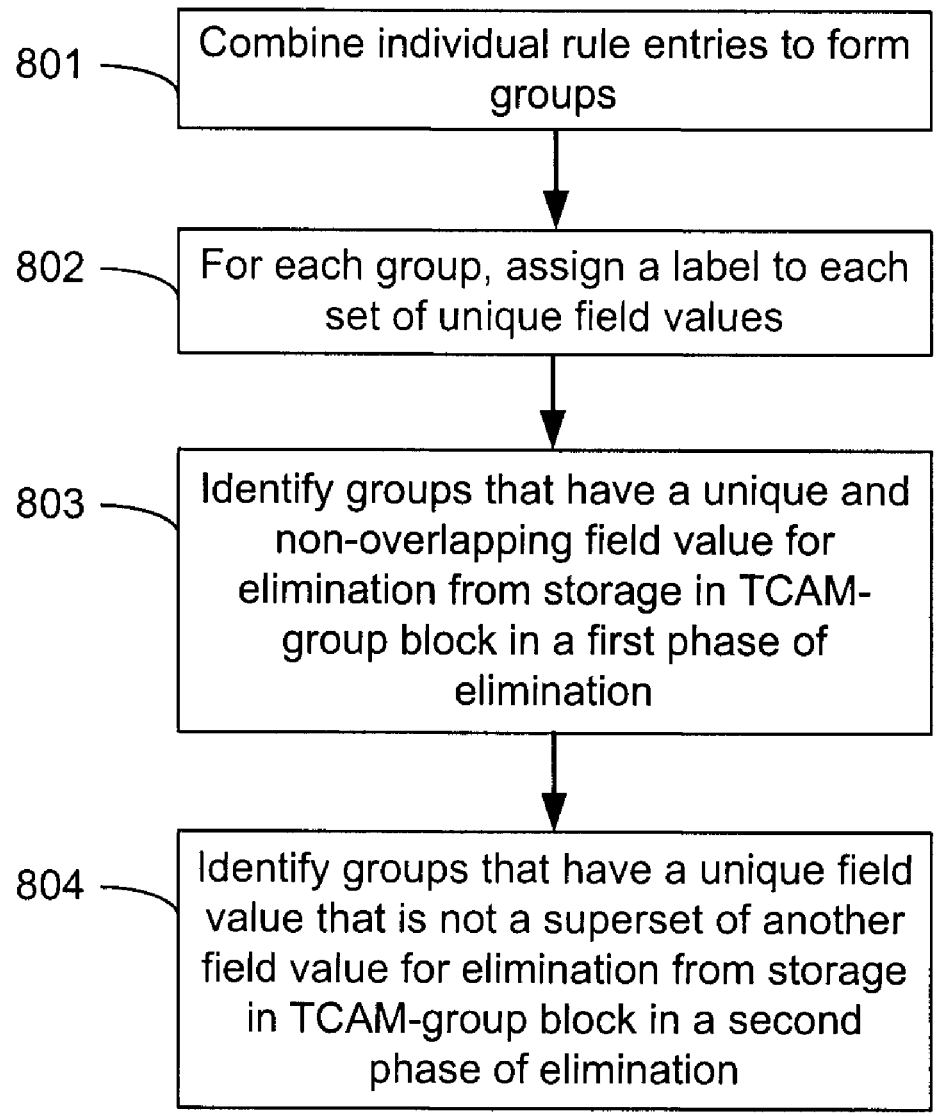
FIG. 8 shows an illustrative flow chart depicting an exemplary operation for eliminating ACL information from storage in the TCAM device.

As shown in FIG. 8, the rules are first combined to form groups in the manner described above with respect to FIGS. 4A-4C (step 801). For this example, the rules 1-12 of Table 5 can be combined to form 7 group entries G1-G7, as summarized below in Table 6, and therefore 7 entries in the TCAM group block are required to store the group label information for the ACL information represented in Table 6. More specifically, rules 3 and 4 can be combined to form group G3 because only the SA field entries of rules 3 and 4 are different, rules 5 and 6 can be combined to form group G4 because only the DA field entries of rules 5 and 6 are different, rules 7 and 8 can be combined to form group G5 because only the SA field entries of rules 7 and 8 are different, rules 9 and 10 can be combined to form group G6 because only the SA field entries of rules 9 and 10 are different, and rules 11 and 12 can be combined to form group G7 because only the DP field entries of rules 11 and 12 are different.

TABLE 6

Grouping Results for ACL2

| Group | Rule | Protocol | Source Address | Destination Address | Destination Port |
|---|---|---|---|---|---|
| G1 | 1 | ICMP | 168.120/16 | * | * |
| G2 | 2 | * | 168.129/16 | * | * |
| G3 | 3 | UDP | 168.120/16 | * | * |
|  | 4 |  | 168.125/16 |  |  |
| G4 | 5 | TCP | 168.120.9/24 | 199.90/16 | * |
|  | 6 |  |  | 194.90/16 |  |
| G5 | 7 | TCP | 168.121.9/24 | 194.90/16 | * |
|  | 8 |  | 168.122.9/24 |  |  |
| G6 | 9 | TCP | 168.122.9/24 | 195.90/16 | * |
|  | 10 |  | 168.123.9/24 |  |  |
| G7 | 11 | UDP | 168.122.9/24 | 194.90/16 | >1680 |
|  | 12 |  |  |  | <1000 |

After the grouping operation that results in formation of the groups G1-G7 of Table 6, for each group, each set of unique field entries that forms a group is assigned a label that identifies the group and that can subsequently be used to determine the group number(s) of the field value set (step 802). FIG. 10A illustrates the assignment of labels in an exemplary embodiment to the sets of unique field entries for groups G1-G7 of Table 6. More specifically, for the present example of ACL2, for the protocol field, the protocol value "icmp" is assigned a label P1, the protocol value "udp" is assigned a label P2, and so on. For the source address field, the SA value "168.120/16" of group 1 is assigned a label S1, the SA value "168.129/16" of group 2 is assigned a label S2, the set of SA entries "168.120/16" and "168.125/16" of group 3 is assigned a label S3, and so on. For the destination address field, the DA value "*" common to groups 1-3 is assigned a label D1, the set of DA entries "199.90/16" and "194.90/16" of group 4 is assigned a label D1, and so on. For the destination port field, the DP value "*" of groups 1-6 is assigned a label E1, and the set of DP entries ">1680" and "<1000" 168.120/16" of group 7 is assigned a label E2.

For the exemplary label assignment depicted in FIG. 10A, if a group contains a set of unique entries for a particular field, then all of those entries are assigned to the same label. For example, because group 3 contains two SA entries "168.120/16" and "168.125/16," the SA set including "168.120/16" and "168.125/16" is assigned to one label (e.g., label S3).

FIG. 10B illustrates the mapping and storage of the unique field entries of the group entries for ACL2 of Table 6 into TCAM field blocks 110A1-110A4 and the storage of associated field labels into corresponding SRAM blocks 120A1-

120A4, as well as the storage of the group labels in the TCAM group block 110B and the group IDs in SRAM block 120B.

As described above with respect to FIGS. 6A-6D, combining the ACL entries into groups can reduce the amount of TCAM storage area required to store the ACL information. For example, while storing the 12 rules of ACL2 of Table 5 requires 12 144-bit storage locations of a TCAM device (e.g., where each rule is stored in a corresponding 144-bit row of the TCAM), the 7 groups of ACL2 rules shown in Table 6 can be stored using only 4×8-bit TCAM rows 110A1 for the protocol field, 7 32-bit TCAM rows 110A2 for the SA field, 4 32-bit TCAM rows 110A3 for the DA field, 2 16-bit TCAM rows 110A4 for the DP field, and 7 72-bit TCAM rows 110B for the group labels, as depicted in FIG. 10B. The various TCAM entries depicted in FIG. 10A can be compacted (e.g., in the manner described above with respect to FIG. 6C) so that the group information of ACL2 shown in Table 6 can be stored in only 11 144-bit TCAM rows, as compared to the 12 144-bit rows required to store the original 12 ACL2 rules of Table 5 in a conventional manner (e.g., where each ACL entry is stored in a corresponding TCAM row).

Referring again to FIG. 8, after the individual ACL rules are combined and labels are assigned to the sets of unique field entries, groups that have at least one unique and non-overlapping field entry are identified for elimination from storage in the TCAM-group block in a first phase of the rule elimination operation (step 803). More specifically, referring to the illustrative flow chart of FIG. 9A, one of the rule fields is selected for examination (step 901). Then, each rule's entry of the selected field is examined to determine whether it is a unique field value and whether it overlaps any other entries in the selected rule field (step 902). If a particular field entry is unique and non-overlapping, as tested at step 903, then the corresponding rule is eliminated from the group entries (step 904). Next, for each rule eliminated from the group entries, a pointer identifying the rule's group and a priority value for the rule are stored in the SRAM device (step 905).

For example, selecting the SA packet header field for examination, the SA field entries "168.129/16," 168.125/16," "168.121.9/24," and "168.123.9/24" are all unique SA entries and do not overlap with any other SA field entries, and therefore information related to their corresponding rule entries 2, 4, 7, and 10 can be eliminated from storage the TCAM-group block because a match with an incoming packet can only match one of these rules. Thus, instead of storing the rule information in the TCAM group block 110B, pointers identifying rules 2, 4, 7, and 10's respective groups G2, G3, G5, and G6 and priority entries PTY=0 are stored in the SRAM, as shown in FIG. 10O. Note that a highest possible priority value (e.g., which for exemplary embodiments described herein is a logic "0") is assigned to rule entries eliminated during phase 1 of the elimination operation. For example, if the SA portion of the search key for an incoming packet is SK="168.129.0.0," the SK can only match the SA field value "168.129/16" corresponding to rule 2, and therefore it is not necessary to perform a group label search in the TCAM-group block.

Note that although the SA field value "168.120.9/24" for rules 5-6 is unique, it overlaps the SA field value "168.120/16" for rule 3, and therefore is not yet eligible for elimination because it overlaps another SA field value. In other words, because the address value "168.120.9/24" is a subset of the address value "168.120/16," the value "168.120.9/24" overlaps the value "168.120/16." For example, if the SA portion of the search key for an incoming packet is SK="168.120.9.0," the SK can match the SA field value "168.120.9/24" corresponding to rules 5-6 of group 4 and also can match the SA field value "168.120/16" of rule 1 (group 1) and rule 3 (group 3), and therefore not all of the group information can be eliminated from the TCAM-group block because the same search key can match multiple groups. Thus, groups containing overlapping field values are identified for elimination from the TCAM-group block during a second phase of the elimination operation, as explained in more detail below with respect to FIG. 9B.

Then, if there are additional packet fields to be examined, as tested at step 906, or if none of the entries of the selected field are unique and non-overlapping, as tested at step 903, a next packet header field is selected for examination (step 901), and steps 902-905 are repeated. Conversely, if there are no more packet header fields to be examined, phase 1 of the elimination operation terminates, and processing continues at step 911 of phase 2, as depicted in FIG. 9B.

For example, selecting the DA packet header field for examination, none of the DA field entries for ACL2 are non-overlapping because all DA field entries share the same prefix as the masked value "*" for rules 1-4. Similarly, because at least one of the DP field entries is a masked value "*," none of the other DP field entries (e.g., ">1680" and "<1000") are non-overlapping. The results of the first phase of the elimination operation are summarized below in Table 7.

TABLE 7

Phase 1 Elimination Results for ACL2

| Group | Rule | Protocol | Source Address | Destination Address | Destination Port |
|---|---|---|---|---|---|
| G1 | 1 | ICMP | 168.120/16 | * | * |
| G3 | 3 | UDP | 168.120/16 | * | * |
| G4 | 5 | TCP | 168.120.9/24 | 199.90/16 | * |
|  | 6 |  |  | 194.90/16 |  |
| G5 | 8 | TCP | 168.122.9/24 | 194.90/16 | * |
| G6 | 9 | TCP | 168.122.9/24 | 195.90/16 | * |
| G7 | 11 | UDP | 168.122.9/24 | 194.90/16 | >1680 |
|  | 12 |  |  |  | <1000 |

Referring again to FIG. 8, in the second phase of the elimination operation, groups that have a unique field entry that is not a superset of another field entry are identified for elimination from the TCAM-group block (step 804). More specifically, referring now to the illustrative flow chart of FIG. 9B, in the second phase, one of the packet header fields is selected for examination in a first step (step 911). Then, each value of the selected packet header field is examined to determine whether it is contained in only one rule group, whether it is not marked as non-removable, and whether no other value in the selected field is a subset of the selected value (step 912).

If overlapping and marking conditions are met, as tested at step 913, then the corresponding rule information can be eliminated from the group entries to be stored in the TCAM group block (step 914), and instead a pointer identifying the rule and a priority value for the rule can be stored in the SRAM device (step 915). For the second phase, the priority value is assigned according to the step number. Thus, while all rule entries eliminated during phase 1 are assigned a priority PTY=0, the rule entries eliminated during phase 2 have a PTY≧1 so that during search operations matches corresponding to rules identified and removed from the TCAM-group block earlier in the elimination process (and thus having a higher degree of uniqueness) are selected as higher-priority matches), as explained in more detail below. Then, all other entries in the selected packet header field that overlap the selected value are protected and their corresponding rules are marked as non-removable (step 916).

For example, selecting the SA packet header field for examination, the SA field value "168.120.9/24" is contained only in rule group G4 (i.e., rules 5 and 6), it is not marked as non-removable, and no other SA value is a subset of the selected SA field value "168.120.9/24" because no other SA value has a longer similar prefix. Thus, because the SA field value "168.120.9/24" meets the conditions tested in step 912, information related to corresponding group G4 (which includes rules 5-6) can be eliminated from storage in the TCAM-group block, and instead pointers identifying rules 5-6's group G4 and priority entries PTY=1 are stored in the SRAM, as shown in FIG. 10C. Further, because the selected SA value "168.120.9/24" is a subset of the SA value "168.120/16" associated with rules 1 and 3, the SA entries "168.120/16" are marked as protected and their corresponding rules 1 and 3 are marked as non-removable. Because rules 1 and 3 are marked as non-removable, the entries for rules 1 and 3 are stored in the TCAM-group block 110B, and their entries are not required in the TCAM field block 110A, as shown in FIG. 9C. The results of Step 1 of the second phase of the elimination operation are depicted below in Table 8A.

TABLE 8A

Phase 2, step 1 Elimination Results for ACL2

| Group | Rule | Protocol | Source Address | Destination Address | Destination Port |
|---|---|---|---|---|---|
| G1 | 1 | ICMP | 168.120/16 | * | * |
| G3 | 3 | UDP | 168.120/16 | * | * |
| G5 | 8 | TCP | 168.122.9/24 | 194.90/16 | * |
| G6 | 9 | TCP | 168.122.9/24 | 195.90/16 | * |
| G7 | 11 | UDP | 168.122.9/24 | 194.90/16 | >1680 |
|  | 12 |  |  |  | <1000 |

Then, if there are additional packet fields to be examined, as tested at step 917, or the conditions specified in step 912 are not met, as tested at step 913, a next packet header field is selected for examination in a next step (step 911), and steps 912-917 are repeated. Conversely, if there are no more packet header fields to be examined, as tested in step 917, phase 2 of the elimination operation terminates.

For one example, selecting the DA packet header field for examination, the DA field value "195.90/16" is contained only in rule 9, it is not marked as non-removable, and no other DA value is a subset of the selected DA field value "195.90/16." Thus, information for rule 9 can be eliminated from storage in the TCAM-group block, and instead a pointer identifying rule 9's group G6 and a priority value PTY=2 are stored in the SRAM, as shown in FIG. 9C. Further, because selected DA value "195.90/16" is not a subset of any other DA entries, no other DA entries are marked as protected, and no corresponding rules are marked as non-removable during analysis of the DA field entries. In addition, note that because the DA value "199.90/16" is unique to rule 5, which was eliminated in step 1 of phase 2, its entry is not required in the TCAM field block 110A. The results of Step 2 of the second phase of the elimination operation are depicted below in Table 8B.

TABLE 8B

Phase 2, step 2 Elimination Results for ACL2

| Group | Rule | Protocol | Source Address | Destination Address | Destination Port |
|---|---|---|---|---|---|
| G1 | 1 | ICMP | 168.120/16 | * | * |
| G3 | 3 | UDP | 168.120/16 | * | * |
| G5 | 8 | TCP | 168.122.9/24 | 194.90/16 | * |
| G7 | 11 | UDP | 168.122.9/24 | 194.90/16 | >1680 |
|  | 12 |  |  |  | <1000 |

For another example, selecting the DP packet header field for examination in a third step, the DP field value ">1680" is contained only in rule 11, it is not marked as non-removable, and no other DP value is a subset of the selected DP field value ">1680." Thus, rule 11 information can be eliminated from storage in the TCAM group block 110B, and a pointer identifying rule 11's group G7 and a priority value PTY=3 are stored in the SRAM, as shown in FIG. 9C. Further, because the selected DA value ">1680" is a subset of the DP entries "*" associated with rules 1, 3, and 5, rules 1, 3, and 5 are marked as non-removable. Information relating to rule 12 can be eliminated from storage in the TCAM group block because its DP value "<1000" is contained only in rule 12, it is not marked as non-removable, and no other DP value is a subset of the selected DP field value "<1000." Thus, a pointer identifying rule 12's group G7 and a priority value PTY=3 are stored in the SRAM, as shown in FIG. 9C. Note that the priority number (PTY) for entries stored in the TCAM-field blocks 110A indicate the relative order in which the corresponding group's information has been eliminated from storage in the TCAM-group block 110B, and their also indicates the relative uniqueness of its corresponding field entry, where a higher priority value indicates a higher level of uniqueness. For example, the SA field value "168.125/16" belonging to rule 4 has the highest possible priority value (PTY=0) because it is a unique and non-overlapping value, while the DA field value "195.90/16" has a PTY=2 because it appears in rules 9 and 10.

The results of Step 3 of the second phase of the elimination operation are depicted below in Table 8C.

TABLE 8C

Phase 2 step 3 Elimination Results for ACL2

| Group | Rule | Protocol | Source Address | Destination Address | Destination Port |
|---|---|---|---|---|---|
| 1 | 1 | ICMP | 168.120/16 | * | * |
| 3 | 3 | UDP | 168.120/16 | * | * |
| 5 | 8 | TCP | 168.122.9/24 | 194.90/16 | * |

Figure 9A:
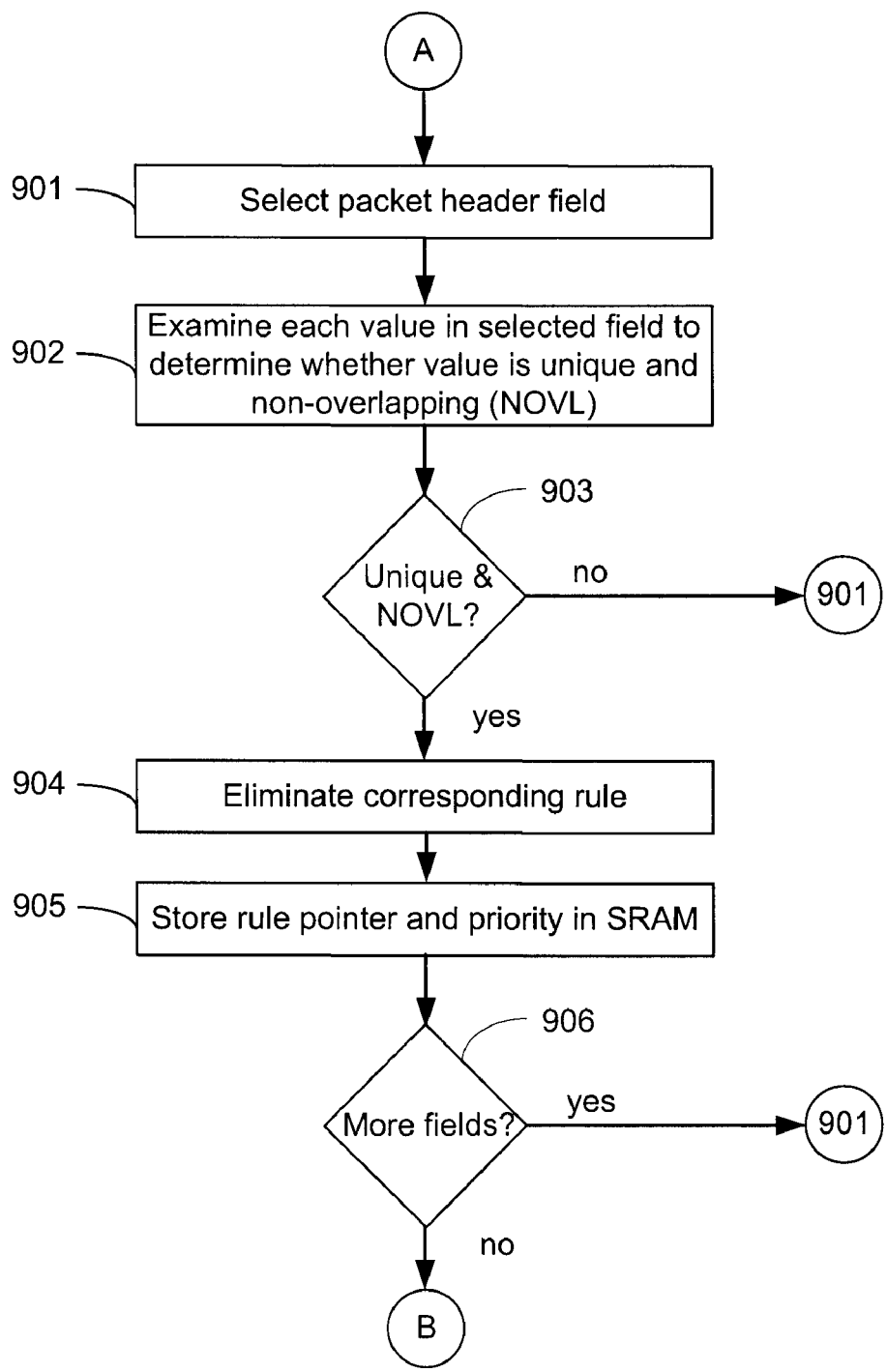
FIG. 9A shows an illustrative flow chart depicting an exemplary operation for a first phase of the elimination operation of FIG. 8.
Figure 9B:
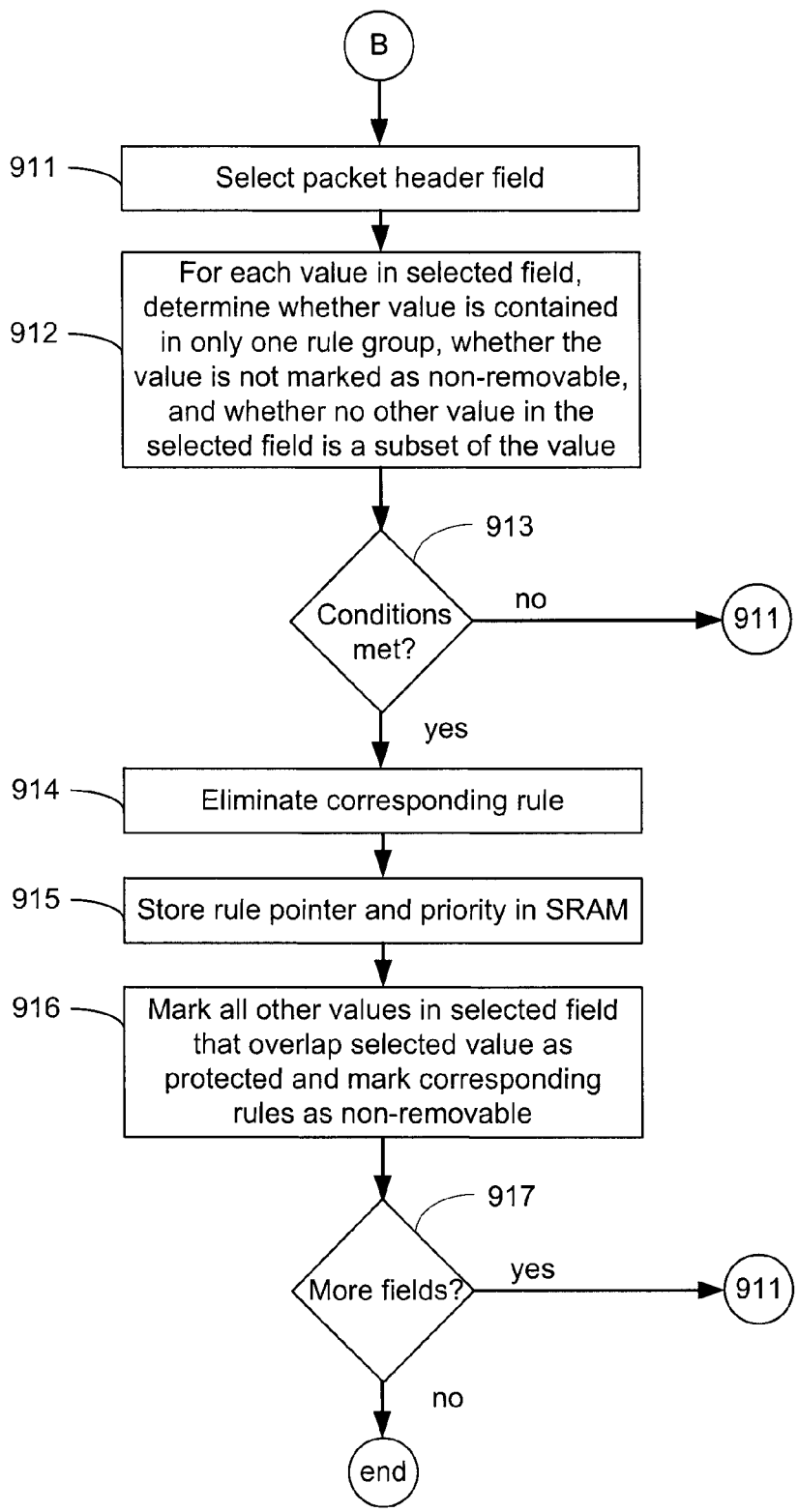
FIG. 9B shows an illustrative flow chart depicting an exemplary operation for a second phase of the elimination operation of FIG. 8.

Further, an exemplary pseudo-code 920 embodying the elimination operation depicted in FIGS. 9A-9B is shown in FIG. 9C.

Eliminating rule/group information from storage in the TCAM-group block 110B and instead storing pointers and priority entries in SRAM blocks associated with the rules' TCAM field block entries can further reduce the amount of TCAM storage area required to store the ACL information. For example, while storing the 12 rules of ACL2 of Table 5 requires 12 144-bit storage locations of a TCAM device (e.g., where each rule is stored in a corresponding 144-bit row of the TCAM), using the grouping and elimination operations described above with respect to FIGS. 9A-9B allows the ACL2 information to be stored using only 4×8-bit TCAM rows 110A1 for the protocol field, 5 32-bit TCAM rows 110A2 for the SA field, 1 32-bit TCAM rows 110A3 for the DA field, 2 16-bit TCAM rows 110A4 for the DP field, and 3 72-bit TCAM rows 110B for the group labels, as depicted in FIG. 9C. The various TCAM entries depicted in FIG. 9C can be compacted (e.g., in the manner described above with respect to FIG. 6C) to be stored in only 7 72-bit or 4 144-bit TCAM rows, as compared to the 12 144-bit rows required to store the original 12 ACL2 rules of Table 5 in a conventional manner (e.g., where each ACL entry is stored in a corresponding TCAM row).

During search operations, the values of the incoming packet's header fields are compared with the entries stored in the TCAM-field block 110A. If there is not a match in the TCAM-field block, then the ACL is not matched. Conversely, if there is a match in the TCAM-field block, the group labels corresponding to the matching TCAM-field entries are read from the SRAM block 120A and the group label with the highest priority is selected and compared with the incoming packet header. If there is a match, the corresponding action is provided. If there is not a match, then the incoming packet header field values are compared with the TCAM-group entries, and if there is a match the corresponding action is provided. For some embodiments, the priority value comparisons can be performed by suitable compare circuitry in control logic 133 (see FIG. 1), although for other embodiments other suitable compare circuitry can be provided.

For one example, if an incoming packet header has the field values {ptcl, SA, DA, DP}={tcp, 168.129.10.10, 132.147.82.31, 25}, the incoming SA value "168.129.10.10" matches the SA entry "168.129/16" stored in TCAM-field block 110A2 and the corresponding group label G2 and PTY=0 are read from the SRAM 120A2 and the incoming DP value "25" matches the DP entry "<1000" stored in TCAM-field block 110A4 and the corresponding group label G7 and PTY=3 are read from the SRAM 120A2. The group label G2 is selected because it has the highest priority value (PTY=0), and the action (e.g., permit) is provided.

For another example, if an incoming packet header has the field values {ptcl, SA, DA, DP}={icmp, 168.120.9.10, 194.90.16.243, 6000}, the incoming SA value "168.120.9.10" matches the SA entry "168.120/16" stored in TCAM-field block 110A2 and the corresponding group label G4 and PTY=1 are read from the SRAM 120A2 and the incoming DP value "6000" matches the DP entry ">1680" stored in TCAM-field block 110A4 and the corresponding group label G7 and PTY=3 are read from the SRAM 120A2. The group label G4 is selected because it has the highest priority value (PTY=1). However, the packet does not match group G4 (e.g., because the incoming DA value of 194.90.16.243 does not match the DA entries 199.90/16 or 194.90/16 for group G4, and therefore a subsequent compare operation in the TCAM-group block 110B is required to match the incoming packet to group G1.

For other embodiments, the elimination operation described above can be modified to consider multiple field entries of the ACL rules simultaneously rather than sequentially in steps for each field. More specifically, for some ACL, if there is not a unique SA field entry or a unique DA field entry, but there is some unique combination of SA and DA field entries, then the rules corresponding to the unique combination of entries of multiple fields can be identified for elimination from storage in the TCAM-group block. For example, referring again to Table 8A, the combination of SA and DA entries "168.122.9/24+194.90/16" is unique and doesn't contain any subset of this particular combination of fields, and thus the corresponding rule 8 (and thus group G5) can be identified for elimination from storage in the TCAM-group block. A pseudo-code 1120 embodying the elimination operation for considering values of multiple fields simultaneously is shown in FIG. 11.

When storing the ACL information in the TCAM-SRAM database, the individual entries that have been combined to form a unique multiple-field value are stored as separate entries the TCAM-field block 110A, and hash values are stored at corresponding locations in the associated SRAM block 120A (e.g., rather than group labels). Further, for each hash value stored in the SRAM block 120, the priority value is set to a tagged value (e.g., PTY=−1) to indicate that the entry stored in the SRAM location is a hash value rather than a group label. For such embodiments, the TCAM-SRAM database is modified to include a hash function generator, a hash table that stores the group label information for the hash values, and compare logic that determines whether entries read from the SRAM block 120A are hash values or group labels (e.g., by examining the priority value). The hash table can be included in a separate SRAM or in any available portion of the SRAM blocks 120A and/or 120B.

For example, the field entries 168.122.9/24" and "194.90/16" are stored in the TCAM-field block 110A, and hash values H1 and H2 are stored at corresponding locations in the associated SRAM block 120A with PTY=−1. Further, the hash table includes a corresponding entry that stores the group label G5 and that is located at an SRAM address generated by hashing H1 and H2 using a suitable hash function.

Then, during search operations, each field value of the incoming packet's header is looked up in the TCAM field block 110A. If there is a match or matches, the corresponding entry or entries are read from the associated SRAM block. If the priority of an entry read from the SRAM is set to the tag value (e.g., PTY=−1), which indicates that the entries are hash values, then the hash values are provided to the hash function generator to generate a hashed value that is used to address a corresponding location in the hash table, which in turn provides the group label. If the priority is not set to the tag value, which indicates that the entry is a label, then the lookup operation continues in the manner described above.

To achieve the reductions in TCAM storage area using the grouping and elimination operations described above, many embodiments of the present invention employ a labeling scheme that labels the ACL groups formed from the combining and/or elimination operations using fixed bit-length ID codes. For some embodiments, the fixed-length ID codes are assigned in a manner that embodies the relationships between the field entries of the various groups, for example, so that if a first group G1 is a subset of a second group G2, the label of G2 contains the label of G1.

More specifically, group labeling schemes in accordance with some embodiments of the present invention can be performed in four steps: (1) splitting the partial overlap, (2) creating the graph, (3) topological order sorting, and (4) group label assignment.

Splitting the Partial Overlap

As mentioned above, the labels of exemplary groups G1 and G2 should overlap if the field entries of groups G1 and G2 overlap. Without any overlapping entries, the number of bits required to assign unique labels to N groups is $L=\log_2 N$. However, where the groups contain overlapping field entries, additional bits are required in the labels to embody the overlapping relationship of their entries. For example, suppose that group G1 contains two field entries E1 and E2, and that group G2 contains two field entries E2 and E3 (e.g., and thus both groups contain the common field entry E2). Because the groups G1 and G2 partially overlap each other, more than $Y=\log_2 2=1$ bits are required to assign labels to G1 and G2.

For this example, 2 ternary bits are required so that, for example, a label L1="*0" is assigned to G1 and a label L2="0*" is assigned to G2. In this manner, the overlapped portion of G1 and G2 (e.g., E2) can have the value "00."

For some embodiments, a heuristic approached is used in which all overlapped portions of the groups are divided into a number of individual segments {SEG;} having no overlap, and then the segments are labeled. For the above example, G1 is divided into E1 and E2, G2 is divided into E2 and E3, and then the segments E1-E3 are labeled such that G1's label L1 is the union of E1 and E2 and G2's label L2 is the union of E2 and E3.

A more detailed example is described below with respect to the illustrative ACL3 shown below in Table 9 in which the destination port field entries include 4 ranges 0 to 600, 601 to 999, 1000 to 10000, and 10000 to 65535, which correspond to the four DP segments $SEG_1$, $SEG_2$, $SEG_5$, and $SEG_4$ respectively.

TABLE 9

| | | | ACL3 | | |
|---|---|---|---|---|---|
| Group | Rule | Protocol | source address | destination address | destination port |
| 1 | 1 | TCP | 10.10/16 | * | * |
| 2 | 2 | UDP | 10.10.20.30 | * | <100 |
| | 3 | | 10.20.30.40 | | 0 |
| | 4 | | 10.30.40.50 | | |
| 3 | 5 | TCP | * | * | >600 |
| 4 | 6 | UDP | 10.20/16 | * | >10000 |

Creating the Graph

To assist in creating labels that embody the overlapping relationship of the DP field entries of ACL3, a graph is created that depicts the relationship between the groups G1-G4 of ACL3. FIG. 12A shows a flow chart depicting an exemplary operation for creating the graph of FIG. 12B that illustrates the relationship between the groups G1-G4 of ACL3. First, for each group G1, a corresponding node Ni is created in the graph (step 1201), and for each non-overlapping group segment SEGi, a corresponding node NIDi is created in the graph (step 1202). For this example, nodes N1-N4 are created for groups G1-G4, respectively, and nodes NID1-NID4 are created for non-overlapping segments SEG1-SEG4, respectively, as shown in FIG. 12B.

Then, for each segment/group pair <SEGi,G1>, a directed edge is created from node NIDi to node Ni (step 1203), and for each group pair <Gi,Gj>, a directed edge is created from Ni to Nj if Gi is a subset of Gj (step 1204). The resulting directed edges are shown in the graph of FIG. 12B, which is known as a directed acyclic graph (DAG) because all partial overlaps are divided into individual segments.

Topological Order Sorting

Figure 12B:
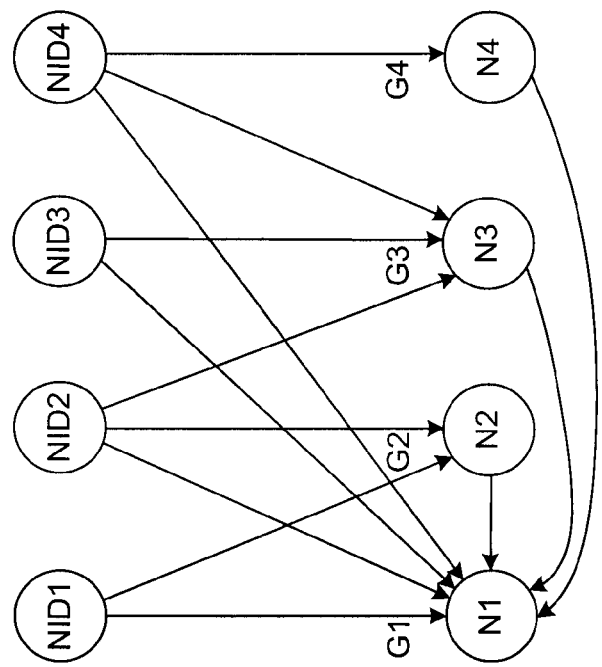
FIG. 12B shows the graph created in an exemplary operation of FIG. 12A for a third ACL.
Figure 12A:
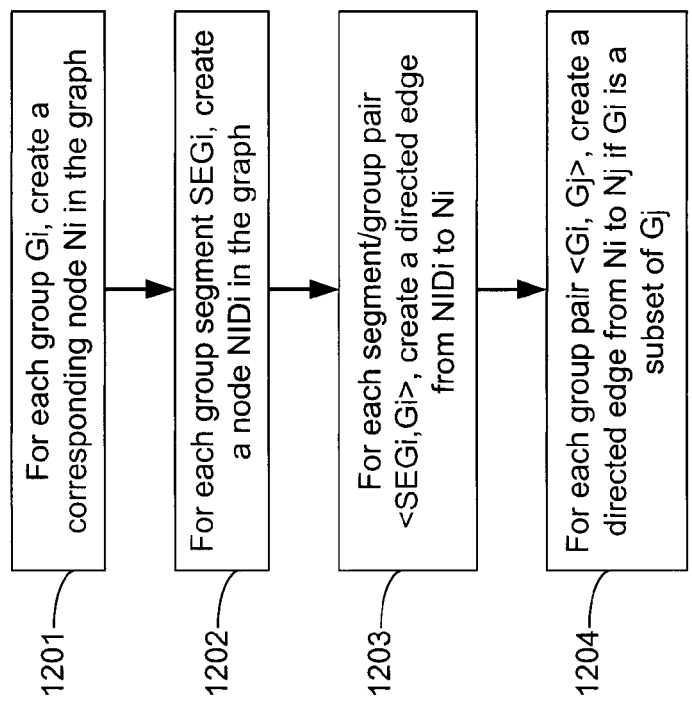
FIG. 12A shows an illustrative flow chart depicting an exemplary operation for creating a graph illustrating the relationship between the groups of an ACL.
Figure 12C:
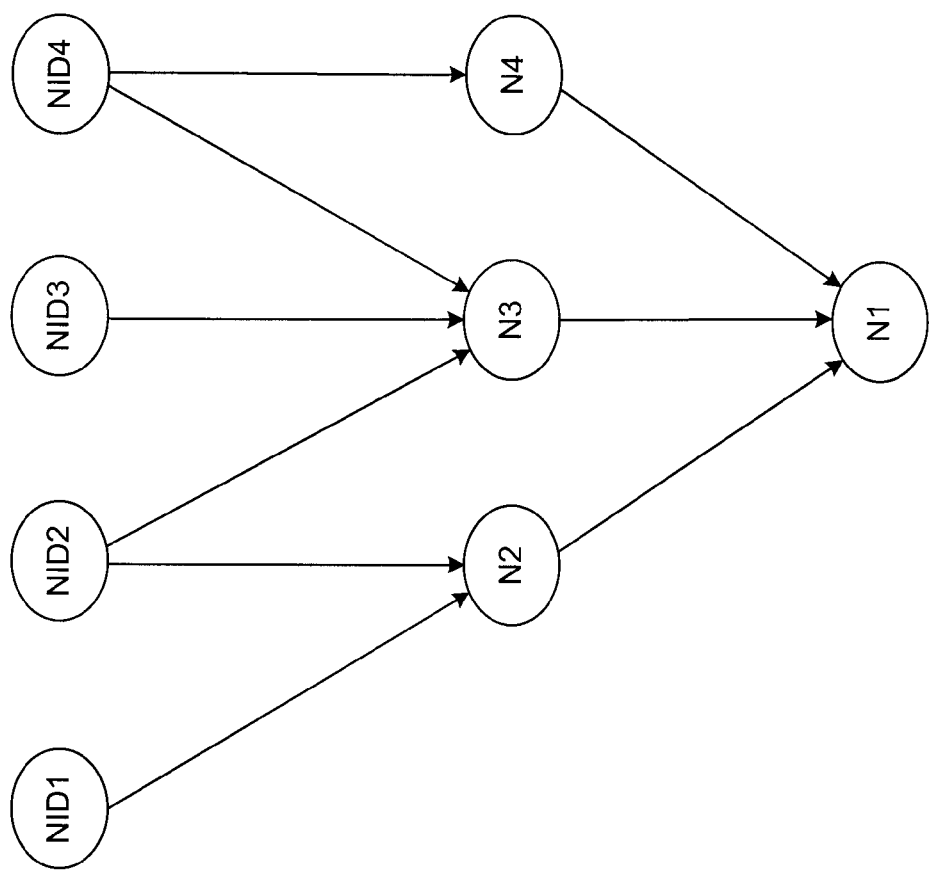
FIG. 12C shows a graph depicting the topological ordering of group nodes of the relationship graph of FIG. 12B.

After formation of the graph of FIG. 12B, the nodes are sorted (e.g., using well-known topological order sorting algorithms) into layers according to the number of incoming edges to the nodes, where the first layer L0 includes nodes having no incoming edges, the second layer includes nodes having at least one incoming edge from a node in the first layer, the third layer includes nodes having at least one incoming edge from a node in the second layer, and so on. The resulting topological ordering of the graph of FIG. 12B is shown in FIG. 12C.

The Group Label Assignment

Figure 13A:
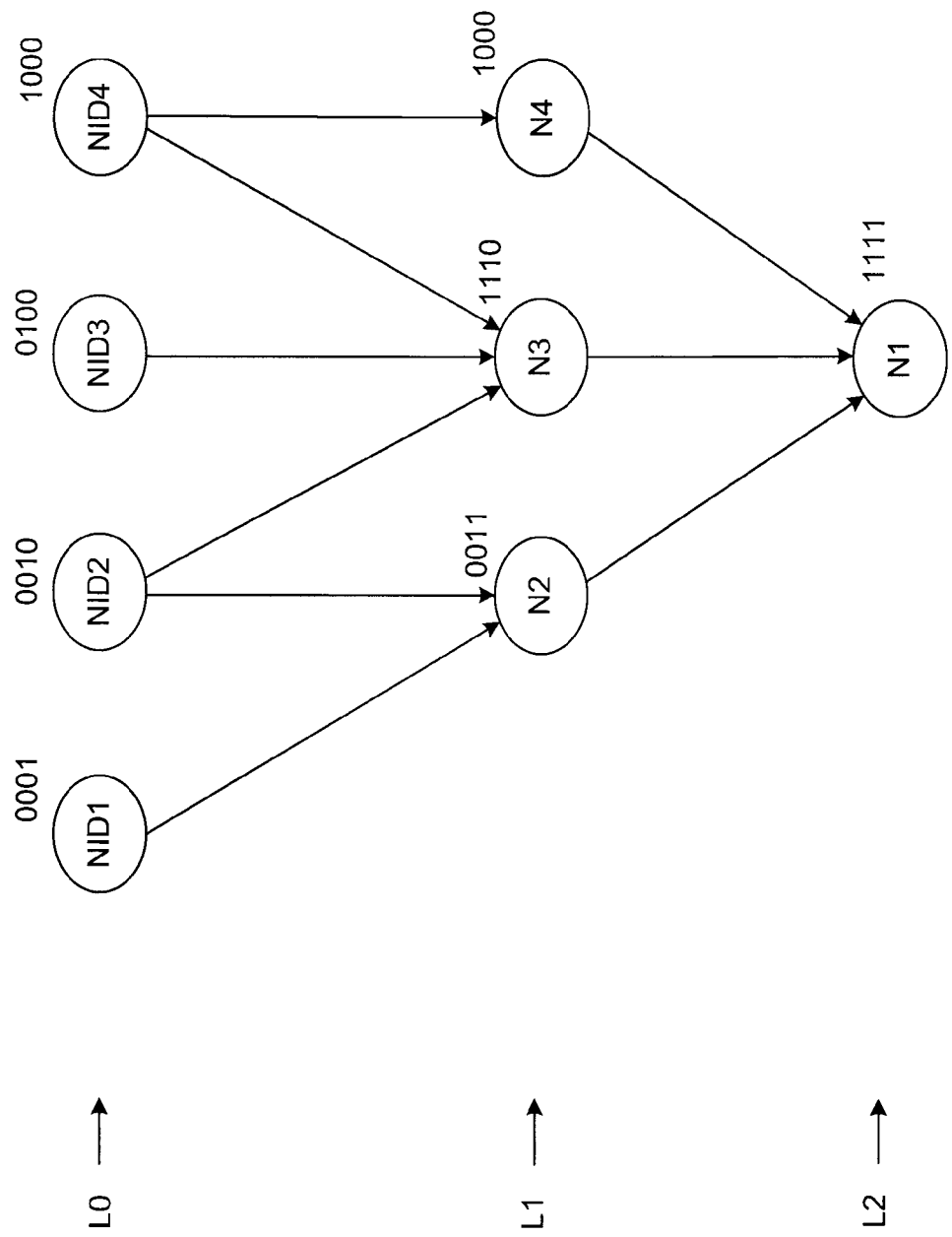
FIG. 13A illustrates an exemplary assignment of labels for the third ACL represented in the graph of FIG. 12B in accordance with first embodiments of the present invention.

Once the topological sorted graph is created, any one of various techniques can be used to assign labels to the nodes of the graph in a manner that embodies the relationships between the field entries of the ACL groups. For first embodiments, a segment bitmap scheme is employed to assign M-bit labels to an ACL having M groups. More specifically, in a first step, each segment node is assigned an M-bit code having a unique bit location asserted, and then in a second step, each group label is generated by taking a bitwise logical OR operation (e.g., the union) of the codes of all segments having a directed edge into the group's node. For the example of FIG. 12C, in the first step, segment node NID1 is assigned a 4-bit code "0001," segment node NID2 is assigned a 4-bit code "0010," segment node NID3 is assigned a 4-bit code "0100," and segment node NID4 is assigned a 4-bit code "1000," as shown in FIG. 13A. Then, in the second step, for example, because group node N2 receives edges from segment nodes NID1 and NID2, the code for group node N2 (which becomes the label for group G2) is generated by taking the bitwise logical OR function of "0001" and "0010" which equals "0011," as shown in FIG. 13A. Similarly, because group node N3 receives edges from segment nodes NID2, NID3, and NID4, the code for group node N3 (which becomes the label for group G3) is generated by taking the bitwise logical OR function of "0010," "0100," and "1000" which equals "1110," as shown in FIG. 13A. Further, because group node N4 receives edges only from segment node NID4, the code for group node N4 (which becomes the label for group G4) is equal to the code for segment node NID4, which is "1000," as shown in FIG. 13A. Lastly, the label for node N1 is the logical OR function of all segment node codes, and thus equals "1111."

Once the labels for all the groups are created in the manner described above, all non-overlapped field segments are stored in the TCAM field blocks (e.g., rather than the distinct field values).

For second embodiments, a pseudo-tree approach is employed in which a breath first tree (BFT) is constructed over the sorted DAG and then labels are assigned to nodes beginning with the root node and progressing to the leaf nodes. In the pseudo-tree approach, each edge in the BFT is assigned a tag that represents the edge. In general, $X=\log_2 L$ bits are needed to distinguish L child nodes or edges from a parent node, and therefore $Y=\log_2 M$ bits are needed to distinguish all edges in a layer in which M is the maximum number of edges among all nodes in the layer. The labels for all nodes in the BFT can be generated by concatenating all tags of edges traversed from the root node to the leaf node using "*" padding, where "*" is a ternary don't care value. After creating the BFT, edges appearing in the sorted DAG but not appearing in the BFT are assigned extra labels, which for some embodiments can be stored in the SRAM.

Figure 13B:
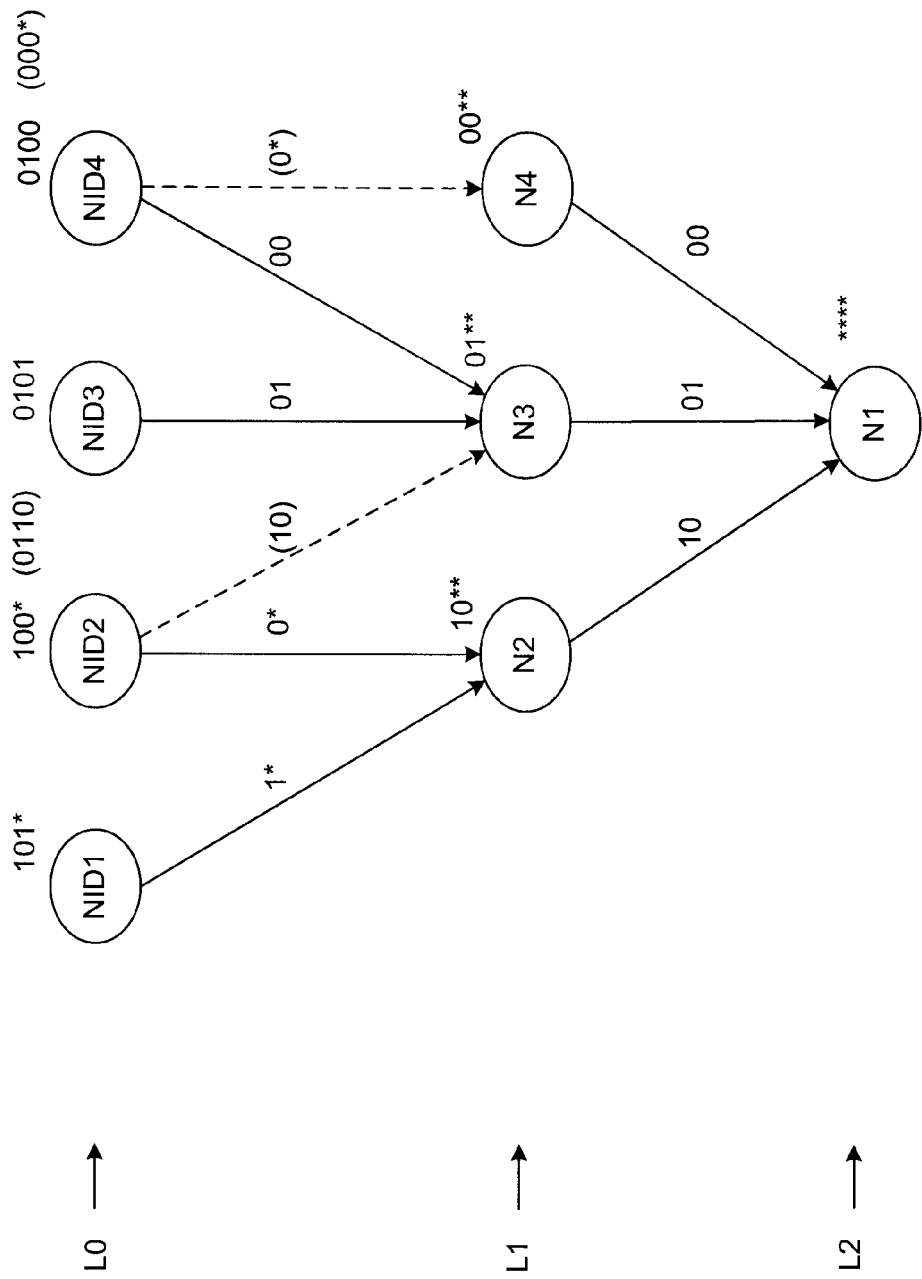
FIG. 13B illustrates an exemplary assignment of labels for the third ACL represented in the graph of FIG. 12B in accordance with second embodiments of the present invention.

For the exemplary graph of FIG. 12C, 2 bits are required to represent the three edges terminating at group node N1, 1 bit is required to represent the two edges terminating at group node N2, 2 bits are required to represent the 3 edges terminating at group node N3, and 1 bit is required to represent the edge terminating at group node N4. Then, "*" are added as padding bits to the labels of the edges having less than 2 bits. The resulting BFT is shown in FIG. 13B. Note that the dashed lines represent those edges that do not exist in the BFT, and additional labels are assigned for these edges (shown in parentheses in FIG. 13B). As a result, nodes NID2 and NID4 each have two labels because of these edges.

During search operations in the TCAM-SRAM database, all possible combinations of labels need to be searched for. For example, if there are two labels for the SA field and 3 labels for the DA field, then 2×3=6 lookup operations are required.

For third embodiments, a group map scheme is employed for ACLs having a relatively small number (e.g., less than 70) groups. In the group map labeling scheme, rather than using the graph to generate the group labels, K bits are used to represent K groups. More specifically, the label of each group G1 with is generated by asserting the ith bit of the label to logic 1 and de-asserting the remaining bits of the label to logic 0. As a result, labels can be assigned to all non-overlapped field values by taking the bitwise logical OR function (e.g., the union) of the label of groups that the field value belongs to. For example, for the ACL3 shown in Table 9, labels are first assigned to the 4 different groups, assigning the label "0001" to group G1, assigning the label "0010" to group G2, assigning the label "0100" to group G3, and assigning the label "1000" to group G4. The labels for each non-overlapped field value are shown below in Table 10.

TABLE 10

| Field Value | Groups containing field value | Label for field value | Field Value | Groups contain this field value | Label for this field value |
|---|---|---|---|---|---|
| 10.10/16 | 1,3 | 0101 | 0~600 | 1,2 | 0011 |
| 10.10.20.30 | 1,2,3 | 0111 | 601~999 | 1,2,3 | 0111 |
| 10.20.30.40 | 2,3,4 | 1110 | 1000~10000 | 1,3 | 0101 |
| 10.30.40.50 | 2,3 | 0110 | 10001~65535 | 1,4 | 1001 |
| * (SA) | 3 | 0100 | TCP | 1,3 | 0101 |
| 10.20/16 | 3,4 | 1100 | UDP | 2,4 | 1010 |
| * (DA) | 1,2,3,4 | 1111 | | | |

During lookup operations in the TCAM-SRAM database, the labels for all fields of an incoming packet are ascertained, and then the common groups are determined from the groups encoded in the labels, for example, by performing a logical AND (e.g., intersection) function on the labels. Next, the smallest group in the resulting group list is selected as the group that the incoming packet belongs to.

For example, if an incoming packet having the header field {ptcl, SA, DA, DP}={upd, 10.20.30.40, 10.20.31.34, 20000) is received, the PTCL lookup for "UDP" in the TCAM field block produces label "1010," the SA lookup for "10.20.30.40" in the TCAM field block produces label "1110," the DA lookup for "10.20.31.34" in the TCAM field block produces the label "1111," and the DP lookup for "20000" in the TCAM field block produces the label "1001." Then, the logical AND function of these 4 labels is "1000," which indicates that the incoming packet belongs to group G4.

Figure 15:
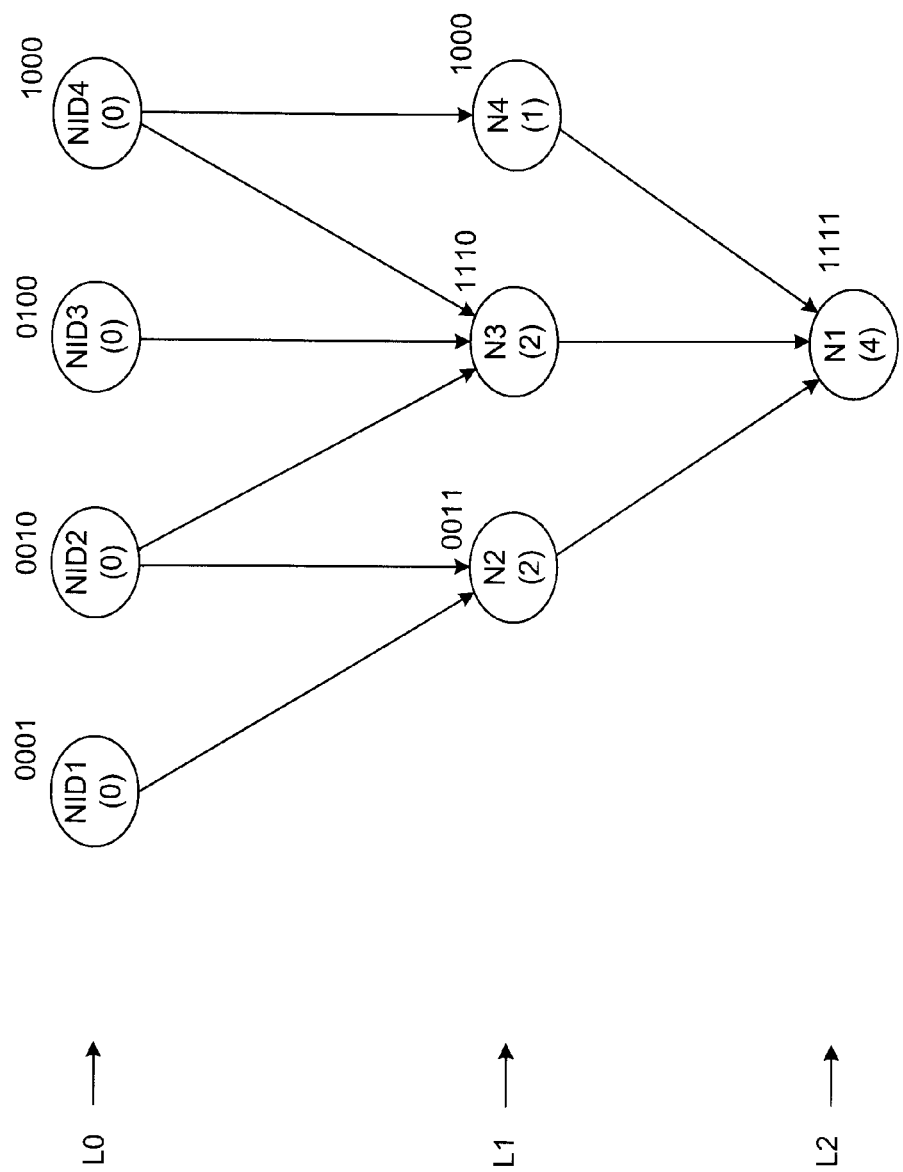
FIG. 15 illustrates the assignment of labels in accordance with other embodiments of the present invention.

For still other embodiments, the number of bits required to assign unique labels to all the groups in an ACL can be minimized using the labeling technique embodied in the pseudo-code 1400 shown in FIG. 14. Application of the labeling technique 1400 of FIG. 14 to the graph of FIG. 12C results in the creation of labels shown in FIG. 15. More specifically, the number of bits required to represent each node are first calculated, starting with the nodes in the bottom layer L0 and ending with the nodes in the top layer L2. For example, for layer L0, because segment nodes NID1-NID4 do not have any child nodes, each of nodes NID1-NID4 requires 0 bits (as indicated in parenthesis in the node), and thus the stat arrays of these four nodes are the same, as indicated in FIG. 15. For layer L1, group node N2 has two child nodes (NID1 and NID2), and thus the number of bits required for group node N2 is calculated as $ceil(\log_2(1+2*2^0))=2$. The number of bits required for group node N3 is calculated to be 2, and the number of bits required for group node N4 is calculated to be 1, as indicated in parentheses in FIG. 15. For layer L2, group node N1 has a child N2 that requires 2 bits, a child N3 that requires 2 bits, and a child N4 that requires 1 bit, and therefore group node N1 requires $ceil(\log_2(1+1*2^1+2*2^2))=4$ bits, which also is the total number of bits required to assign labels for the tree because group node N1 is the root node.

Next, labels are assigned to each node beginning with the top layer L2 to and ending with the bottom layer L2. Note that the label of a node contains the code of its parent node and its own unique code, and also contains a prefix length that indicates the "effective" portion of the label. The effective portion of the label can be calculated by subtracting the number of bits that a node requires from the total number of bits required to label the entire tree. For example, a label having a prefix length 2 indicates that the first two bits of the label are used to represent the corresponding node, with the remaining bits masked (e.g., as ternary don't care "*" values).

To assign the labels depicted in FIG. 15, a label equal to "0000/0" is assigned to group node N1 because N1 is the root node. Thus, the label for group node N1 will be stored as "****" in the TCAM block of the TCAM-SRAM database. For group node N3, its label is the bitwise logical OR function of its parent's label ("0000") and the "code" of bit length 2 at its parent node ("100"), which results in a label of "0100" for group node N3. The prefix length of N3 is 4−2=2, which gives a label of "0100/2" for N3. As shown in the labeling technique 1400 shown in FIG. 14, the "Code" of the corresponding bit of the stat array in the parent's node is incremented when assigning the current "Code" to a child node, and therefore, the "Code" in N1 for bit length 2 is 1000 (0100+(1<<2)= 1000). Similarly, group node N4 is assigned the label "0010/ 3." The labels for segment nodes $NID_1$, $NID_2$, $NID_3$, and $NID_4$ are shown in FIG. 15. Note that segment nodes NID2 and NID4 each have 2 labels because each node NID2 and NID4 has two parent nodes.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A packet classification device for storing a number of groups of rules associated with one or more access control lists (ACLs), wherein each rule includes a plurality of packet header fields and an action field, the packet classification device comprising:
   a first content addressable memory (CAM) block configured to store only unique entries for each packet header field;
   a first random access memory (RAM) block coupled to the first CAM block and configured to store field labels for the unique packet header field entries stored in the first CAM block, wherein each field label indicates which groups of rules contain the corresponding unique field entry;
   a second CAM block configured to store a plurality of group labels, wherein each group label consists of a unique combination of concatenated field labels; and
   a second RAM block coupled to the second CAM block and configured to store a group identification (ID) for each group label, wherein each group ID identifies a corresponding one of the groups of rules associated with one or more of the ACLs and stored in the device, wherein each rule includes the packet header fields and the action field.

2. The packet classification device of claim 1, wherein the packet header fields comprise a source address field and a destination address field.

3. The packet classification device of claim 1, further including a control circuit coupled to the CAM blocks and to the RAM blocks, the control circuit comprising:
   control logic having an input to receive a packet header including a plurality of field values and having an output to provide an action code;
   a packet header register coupled to the control logic and configured to store the packet header field values; and
   a result register coupled to the control logic and configured to store field labels output from the first RAM block.

4. The packet classification device of claim 3, wherein:
   during first compare operations, the control circuit provides each packet header field value as a separate first search key to the first CAM block for comparison with the unique field entries stored therein, and in response thereto the first RAM block outputs the field labels corresponding to the matching field entries; and
   during second compare operations, the control circuit concatenates the field labels output from the first RAM block to form a second search key and provides the second search key to the second CAM block for comparison with the group labels stored therein, and in response thereto the second RAM block outputs the group ID corresponding to the matching group label.

5. The packet classification device of claim 1, wherein the first CAM block comprises a plurality of independently and simultaneously searchable CAM arrays, wherein each of the CAM arrays is assigned to store the unique entries for a corresponding one of the packet header fields.

6. The packet classification device of claim 5, wherein:
   a first of the CAM arrays is assigned to store source address entries and its corresponding RAM block is assigned to store source address labels; and
   a second of the CAM arrays is assigned to store destination address entries and its corresponding RAM block is assigned to store destination address labels.

7. The packet classification device of claim 5, wherein the first CAM block comprises a plurality of rows of CAM cells divided into a number of segments, wherein the segments within each row are assigned to store the unique entries of different packet header fields.

8. The packet classification device of claim 7, wherein:
   a first of the CAM arrays includes a first segment to store source address entries for a first ACL and includes a second segment to store destination address entries for a second ACL; and
   a second of the CAM arrays includes a first segment to store destination address entries for the second ACL and includes a second segment to store source address entries for the first ACL.

9. The packet classification device of claim 1, wherein each field label stored in the first RAM block comprises an offset value indicating which individual rule the corresponding unique field entry belongs to.

10. The packet classification device of claim 1, wherein each CAM block comprises a plurality of rows of ternary CAM cells.

11. A packet classification device for storing a number of groups of rules associated with one or more access control lists (ACLs), wherein each rule includes a source address entry and a destination address entry, the packet classification device comprising:
   a first content addressable memory (CAM) block configured to store only unique source and destination address entries;
   a first random access memory (RAM) block coupled to the first CAM block and configured to store a source address label for each unique source address entry and a destination address label for each unique destination address entry, wherein the address labels indicate which groups of rules contain the corresponding unique address entries;
   a second CAM block configured to store a plurality of group labels, wherein each group label comprises a unique concatenation of the source and destination address labels;
   a second RAM block coupled to the second CAM block and configured to store a group identification (ID) for each group label, wherein each group ID identifies a corresponding one of the groups of rules associated with one or more of the ACLs and stored in the device, wherein each rule includes the source address entry and the destination address entry; and
   a control circuit having an input to receive a packet header containing a source address value and a destination address value.

12. The packet classification device of claim 11, wherein the control circuit is configured to provide the source and destination address values as first search keys to the first CAM block during first compare operations, to concatenate the source and destination address labels output from the first RAM block in response to match conditions in the first compare operations to generate a second search key, and to provide the second search key to the second CAM block during a second compare operation to determine whether the second search key matches any of the group labels.

13. The packet classification device of claim 12, wherein the control circuit comprises:
   control logic having an input to receive a packet header including a plurality of field values and having an output to provide an action code;
   a packet header register coupled to the control logic and configured to store the packet header field values; and
   a result register coupled to the control logic and configured to store field labels output from the first RAM block.

* * * * *